United States Patent
Shichman et al.

(10) Patent No.: US 11,956,516 B2
(45) Date of Patent: Apr. 9, 2024

(54) SYSTEM AND METHOD FOR CREATING AND DISTRIBUTING MULTIMEDIA CONTENT

(71) Applicant: W.s.c. Sports Technologies Ltd., Bene Beraq (IL)

(72) Inventors: Daniel Shichman, Tel Aviv (IL); Shmulik Yoffe, Petah-Tikva (IL); Haim Gal, Hadera (IL); Aviv Arnon, Tel Aviv (IL)

(73) Assignee: W.S.C. SPORTS TECHNOLOGIES LTD., Givatayim (IL)

( * ) Notice: Subject to any disclaimer, the term of this patent is extended or adjusted under 35 U.S.C. 154(b) by 0 days.

(21) Appl. No.: 15/566,730

(22) PCT Filed: Apr. 17, 2016

(86) PCT No.: PCT/IL2016/050402
§ 371 (c)(1),
(2) Date: Oct. 16, 2017

(87) PCT Pub. No.: WO2016/166764
PCT Pub. Date: Oct. 20, 2016

(65) Prior Publication Data
US 2018/0132011 A1 May 10, 2018

Related U.S. Application Data

(60) Provisional application No. 62/148,191, filed on Apr. 16, 2015.

(51) Int. Cl.
*H04N 21/81* (2011.01)
*G06V 20/40* (2022.01)
(Continued)

(52) U.S. Cl.
CPC ......... *H04N 21/8133* (2013.01); *G06V 20/47* (2022.01); *G11B 27/00* (2013.01);
(Continued)

(58) Field of Classification Search
CPC ........... H04N 21/233; H04N 21/23418; H04N 21/235; H04N 21/8133; H04N 21/8456;
(Continued)

(56) References Cited

U.S. PATENT DOCUMENTS 9,477,744 B2   10/2016   Barthel et al.
9,727,634 B2   8/2017    Barthel et al.
(Continued)

FOREIGN PATENT DOCUMENTS

CN   102547139        7/2012
WO   WO 2010/057085   5/2010
WO   WO 2014/183034   11/2014

OTHER PUBLICATIONS

International Search Report of Application No. PCT/IL2016/050402 dated Jul. 28, 2016.
(Continued)

*Primary Examiner* — Nicholas T Corbo
(74) *Attorney, Agent, or Firm* — PEARL COHEN ZEDEK LATZER BARATZ LLP

(57) ABSTRACT

A system and method may analyze an input video content to produce analysis results. An event captured in the input video content may be identified based on the analysis results. A start time and an end time of a segment of the input video content, the segment including the event, may be determined and, an output video content may be generated by including the segment in the output video content.

23 Claims, 8 Drawing Sheets

(51) Int. Cl.
*G11B 27/00* (2006.01)
*G11B 27/031* (2006.01)
*G11B 27/10* (2006.01)
*G11B 27/28* (2006.01)
*G11B 27/30* (2006.01)
*H04N 21/233* (2011.01)
*H04N 21/234* (2011.01)
*H04N 21/235* (2011.01)
*H04N 21/845* (2011.01)

(52) U.S. Cl.
CPC ............ *G11B 27/031* (2013.01); *G11B 27/10* (2013.01); *G11B 27/28* (2013.01); *G11B 27/3036* (2013.01); *H04N 21/233* (2013.01); *H04N 21/234* (2013.01); *H04N 21/23418* (2013.01); *H04N 21/235* (2013.01); *H04N 21/8456* (2013.01)

(58) Field of Classification Search
CPC .. G06K 9/00751; G11B 27/00; G11B 27/031; G11B 27/10; G11B 27/28; G11B 27/3036
See application file for complete search history.

(56) References Cited

U.S. PATENT DOCUMENTS

| | | |
|---|---|---|
| 10,740,305 B2 | 8/2020 | Barthel et al. |
| 10,963,439 B1 | 3/2021 | Barthel et al. |
| 2006/0218492 A1* | 9/2006 | Andrade ............... G06F 40/166 715/234 |
| 2008/0143875 A1 | 6/2008 | Scott et al. |
| 2009/0132924 A1* | 5/2009 | Vasa ........................ H04N 5/76 715/723 |
| 2010/0107080 A1 | 4/2010 | Bentley et al. |
| 2013/0326406 A1 | 12/2013 | Reiley et al. |
| 2015/0082349 A1* | 3/2015 | Ishtiaq ............. H04N 21/23418 725/40 |
| 2015/0310894 A1* | 10/2015 | Stieglitz ............. H04N 21/8456 386/241 |
| 2016/0105733 A1* | 4/2016 | Packard ............ H04N 21/8549 725/32 |

OTHER PUBLICATIONS

European Search Report of Application No. EP 16779717 dated Aug. 24, 2018.
Jungong Han et al., "Multilevel analysis of sports video sequences", Multimedia content analysis, Management and Retrieval 2006, Proceedings of SPIE, US, vol. 6073, p. 607303-1, Jan. 1, 2006.
Chinese Office Action for application No. 2016800329124 dated Oct. 8, 2019.
Office action for Israel Patent Application No. 255066, dated Dec. 23, 2021.

\* cited by examiner

SYSTEM AND METHOD FOR CREATING AND DISTRIBUTING MULTIMEDIA CONTENT

CROSS-REFERENCE TO RELATED APPLICATIONS

This application is a National Phase Application of PCT International Application No. PCT/IL2016/050402, International Filing Date Apr. 17, 2016, claiming the benefit of U.S. Patent Application No. 62/148,191, filed Apr. 16, 2015, all of which are hereby incorporated by reference.

FIELD OF THE INVENTION

The present invention relates generally to creation and presentation of multimedia content. More specifically, the present invention relates to methods, devices and systems for synchronizing a video clip with related metadata, audio data and other content.

BACKGROUND

The amount of multimedia content available to users is continuously increasing, at a fast rate. For example, a large number of video clips (some of considerable length) are typically available for a sporting event, e.g., a basketball or soccer game. However, users may only want to see specific events or elements in a video clip. For example, a sports fan may only want to see his or her favorite player, important events such as goals, or highlights of a game. However, using current systems and methods, a user needs to spend considerable time watching an entire video clip in order to see the parts of interest.

SUMMARY

In some embodiments, an input video content may be received and analyzed to produce analysis results. An event captured in the input video content may be identified based on the analysis results. A start time and an end time of a segment of the input video content, the segment including the event, may be determined and, an output video content may be generated by including the segment in the output video content.

Analyzing the input video content may include identifying at least one of: a transition, a score of a game, a change of source camera, a close-up, a movement of a player or object, a pan, tilt and zoom of a camera, a widening and narrowing of a field of view of a camera, face identification and a number identifying a player or object. An input video may include a sporting event.

An input video may include audio content and analyzing the input video content to produce an analysis result may include analyzing the included audio content. An input video may include textual content and analyzing the input video content to produce an analysis result may include analyzing the included textual content.

Data related to the input video content may be received, the received data may include at least one of: audio content and textual content not included in the input video content. Producing the analysis result may be based on analyzing the received data. Received data may include structured data and/or free text. Free text may include closed captions and/or a transcript.

A plurality of events captured in the video content may be identified and may be associated, based on an analysis result and based on at least one criterion, with a respective plurality of ranks. One or more segments of an input video content may be included in an output video content based on one or more respective ranks of the segments.

A plurality of events may be included in an output video clip such that the output video clip includes a narrative related to at least one of: a player, a chronological aspect, a progress of a sports event and a score. A plurality of events may be included in an output video clip such that the output video clip includes highlights.

Received data may be synchronized with an input video content to produce synchronized external data and events may be identified, in an input video content, based on the synchronized external data. A time indication may be determined based on received data and a start time and an end time of a segment of the input video content, the segment including the event, may be defined such that the segment includes a time indicated in the time indication.

A category of an input video content may be received or determined and selecting to include, in an output video content, one or more of a plurality of events may be based on the category. A plurality of events in the input video content may be identified and selecting to include, in an output video content, one or more events or parts of events may be based on a target audience of the output video content. Selecting to include, in an output video content, one or more events or parts of events may be based on a desired length of the output video content.

Metadata related to an input video content may be generated and including, in an output video content, one or more segments of the input video content may be based on the metadata. Events may be associated with a ranks is based on input from users.

A system and method may select to include, in an the output video content, one or more events based on semantic analysis of text in a web page and the output video content may be embedded in the web page. One of: an outro, a middle-graphics and an intro may be obtained or generated and may be included in an output video content. One of a replay and a slow motion effect may be identified in an input video content and may be associated with one or more identified events. A replay or a slow motion effect may be placed, in an output video content, near an associated event.

A secondary input video content may be synchronized with an input video content and at least one segment of the input video content and one segment of the secondary input video content may be included in an output video content. An input video content may be synchronized with a video content used by a remote system; information related to a start time and an end time of an event may be sent to the remote system; and the information may be used, by the remote system, to produce a remote video output content.

Content may be sent to the remote system and the remote system may include the content sent in video output content. The remote video output content may be a broadcast quality video content. A start time and an end time of an event captured in an input video content may be determined; a first segment of the input video content may be encoded, the first segment including the start time and up to a key-frame; a second segment of the input video content may be direct-copied, the second segment including the key-frame and the end time, and an output video content may be generated by concatenating the first and second segments.

A start time and an end time of one or more events captured in the input video content may be determined; one or more encoded event segments may be generated by encoding portions of segments that include the events; the one or more of the encoded event segments may be cached and, the cached encoded event segments may be re-used by, for each of a plurality of output video content objects: encoding one or more transition video segments to produce encoded transition segments, and producing the output video content object by concatenating one or more encoded transition segments and one or more of the cached encoded event segments.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
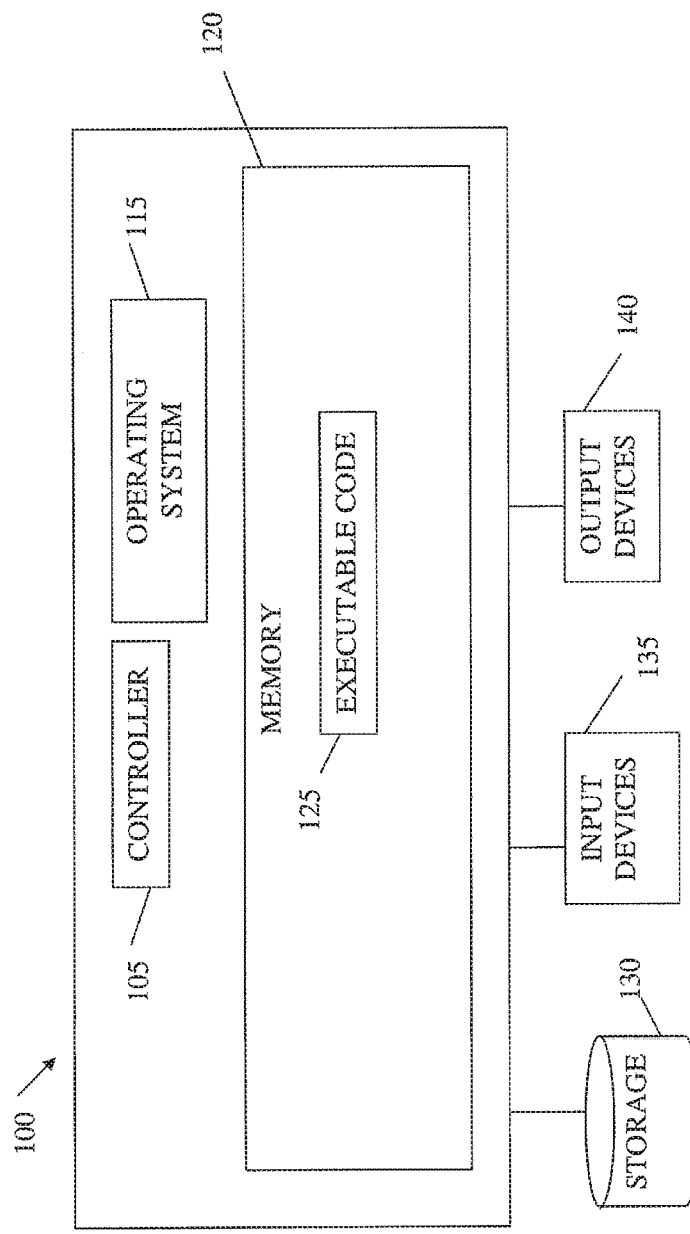
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, a storage 130, input devices 135 and 1 output devices 140.

Operating system 115 may be or may include any code segment designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system. Accordingly, modules or units that include (or share) at least controller 105, memory 120 and executable code 125 as described herein may readily communicate, share data and otherwise interact.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer or processor non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that synchronizes events, metadata, audio content and video clips to generate or create output multimedia content. In some embodiments, synchronizing events, metadata, audio content and video clips to generate or create output multimedia content may be done using a plurality of code segments similar to executable code 125 that may cause one or more controllers 105 to collaborate in performing required tasks. Controller 105 may be configured to perform methods as discussed herein for example by executing code or software, for example, code or software stored in memory 120. Controller 105 may be, or include the functionality of, modules discussed herein such as audio analysis module 310, synchronization module 315, user interface module 320, ranking module 325, and other modules. A video clip may be for example a movie, or a series of image frames which when viewed in sequence shows a moving image with typically audio. Content may be data, typically media data, users want to listen to or view, e.g., video clips or recordings, audio clips, etc.

Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 130 and may be loaded from storage 130 into memory 120 where it may be processed by controller 105. For example, metadata, audio content and video clips may be stored in storage 130 and may be loaded from storage 130 into memory 120 where they may be examined and processed by controller 105 that may further create new video clips based on the loaded data.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), printer, a display, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a system according to some embodiments may include a storage medium, such as memory 120, computer-executable instructions, such as executable code 125, and a controller, such as controller 105.

A system according to some embodiments of the invention may include a plurality of devices similar to device 100. A system according to some embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. According to some embodiments, a system may additionally include other suitable hardware components and/or software components. In some embodiments, a system may include or may be, for example, one or more personal computers, mobile computers, laptop computers, server computers, network devices, or any other suitable computing devices.

According to some embodiments a system, modules or units described, or referred to herein, may include elements included in device 100 described herein. For example, according to some embodiments, a system that generates video clips as described herein may include a controller 105, a memory 120, and an executable code 125.

A plurality of executable code segments similar to executable code 125 may be loaded into memory 120 and executed by controller 105. For example, an embodiment that creates video clips as described herein may include a synchronization module that synchronizes metadata and video clips, a ranking module that ranks segments of video clips, an audio analysis module that analyzes audio content and other modules or units as described herein.

The term "video clip" is known in the art. As referred to herein, the term "video clip" relates to a sequence of image frames which, when viewed in sequence give the impression of a moving image. A video clip may include audio content that may be provided together with the visual content of the video clip.

Figure 2:
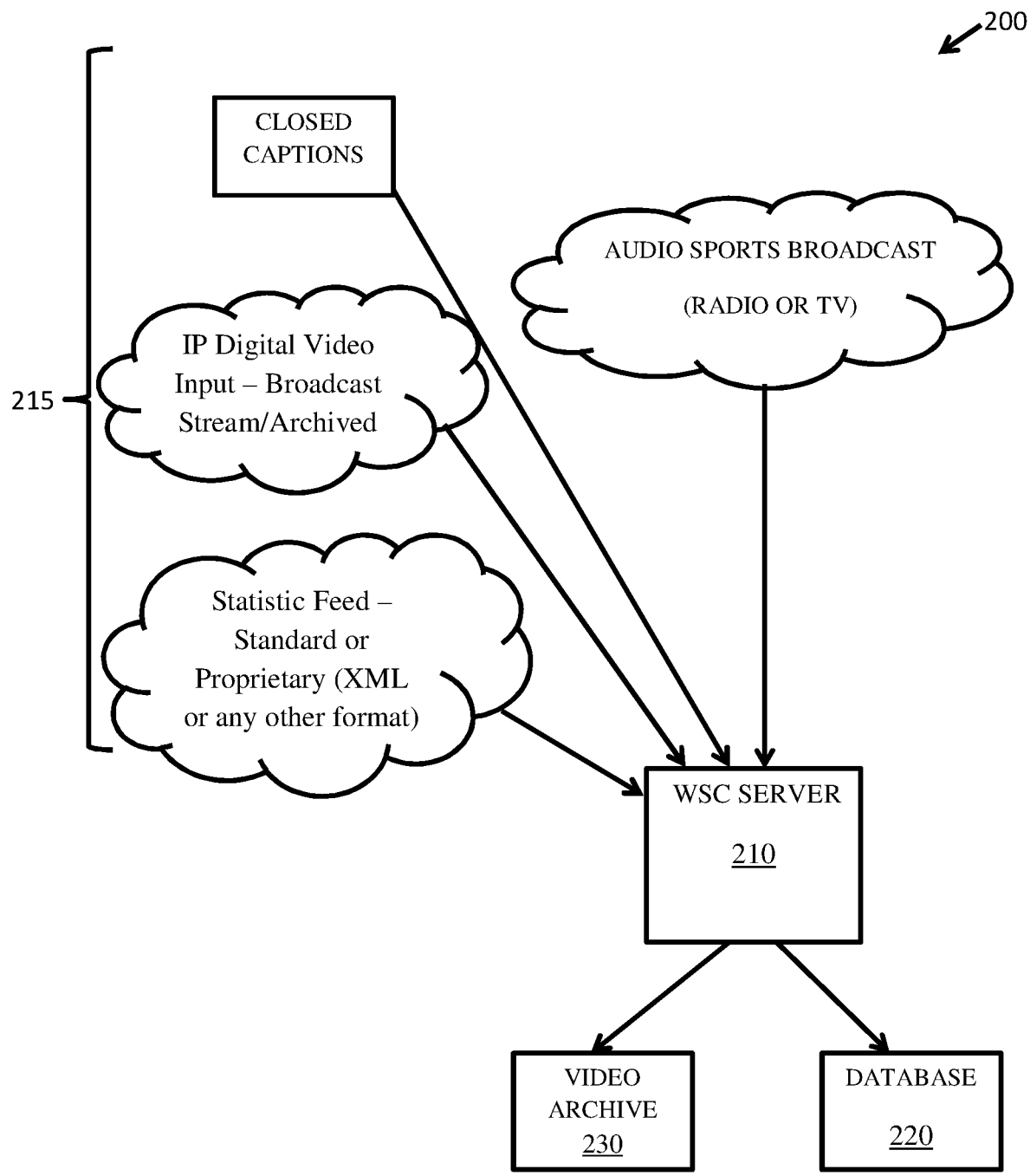
FIG. 2 shows an exemplary system according to embodiments of the invention.

Reference is made to FIG. 2 that shows an exemplary system 200 according to embodiments of the invention. As shown, system 200 may include a server 210. As shown, server 210 may be operatively connected to a database 220 that may store metadata objects. As shown, server 210 may be operatively connected to a video archive 230. Video archive 230 may store video clips. As shown by input 215, server 210 may be provided with input that may include video streams or clips and metadata. Video archive 230 may store both input video content (e.g., received from the internet or from a broadcast service) and video clips created by system 200 as described herein. Various parts of system 200, e.g., server 210, database 220, etc., may be structured such as the system shown in FIG. 1, including a processor, etc.

As shown, input 215 may include video content. For example, input video included in input 215 may be Internet Protocol (IP) video streams received by server 210 using Real Time Messaging Protocol (RTMP) or using Hypertext Transfer Protocol (HTTP) Live Streaming (HLS) as known in the art. Any other system or method may be used in order to provide server 210 with input video clips as shown by input 215.

Video feed or input as shown by input 215 may be encoded in any standard or proprietary video encoding. Video feed, input or streams may be encoded video, but may also be in uncompressed formats or any digital format of video. Server 210 may archive input video content on video archive 230, e.g., in the form of HTTP Live Streaming (HLS) chunks as known in the art. Server 210 may archive input video content using any media server archiving capabilities. For example, video archive 230 may be a cloud-based storage storing video content according to any format of digital storage.

Video feed or input as shown by input 215 may be a live video stream, e.g., provided in real-time from a live digital channel or it may be non-live video, e.g., a video file or video from an HLS archive. Video feed or input as shown by input 215 may include a video file that may be created according to any format. For example, H.264, MP4 or other encoding formats may be used as well as any video containers as known in the art.

Metadata for (or of) a data object as referred to herein may be, or may include, one or more data elements that describe, or provide other information for, other data, beyond the primary data (e.g., the video clip itself) for the data object. For example, metadata of a video clip may be its length, the time it was received by a server, specific times of the clip, or who is seen in the video clip (e.g., a name of a player shown in a video may be included in metadata), or what happens in the clip (such as '3-point basket'). Other metadata may be or may include the number of users who commented on an event shown in a video segment or any other information related to a video clip. As described herein, metadata received as input (e.g., in input 215) may be stored in metadata objects that may be associated with a video clip or with other content.

Metadata included in input 215 may be information or data formatted according to the Extensible Markup Language (XML) known in the art or any other format of data. Metadata included in input 215 may be received from any data provider or source, for example, metadata may be received from in-stadium stats curators and/or video tracking systems. Metadata may be received from professional game analysis systems, none-professional or amateur, or any type of data created for other purposes such data created for the gambling industry as known in the art. For example, metadata may be received from a statistics feed of events happening in a sports competition. Metadata may be included in, or received from, a commodity data feed that can be acquired, for example from data providers like OPTA, Stats Inc., SportsData and the like. Metadata may be in any proprietary or standard data structure or format.

Although sporting events are mainly described herein, it will be understood that systems and methods according to embodiments of the invention may be related to any other applicable content. For example, an automated system and method for identifying events in other video content, not only sports, may be contemplated. Accordingly, other sources than those shown by 215 may be used. For example, creating metadata and event objects and associating the objects with a video clip may be done for a video containing musical content, news or any other topic or subject. Accordingly, it will be understood that the scope of the invention is not limited by the type of content in the video clips received and processed as described herein.

Metadata included in input 215 may include, for example, events from a sports competition that may be shown in a related video source. For example, metadata may include parameters and descriptions of events, e.g., scores, fouls and time information of a sports event that may be shown in a related or associated video clip.

As shown, input 215 may include audio content. For example, audio content received by server 210 as shown by input 215 may be or may include audio tracks and broadcasts from television and radio stations or audio content received from the internet or as an audio track of the received video source (HLS, or in any other format the video has arrived). As further shown, input 215 may include closed captions (or subtitles) that may be analyzed (e.g., using text analysis techniques known in the art). For example, metadata related to a video may be created based on analyzing closed captioned data.

Cloud-computing, cloud architecture and/or cloud-based computing generally refer to providing services over the internet as known in the art. In some embodiments, cloud architecture may be achieved by providing, on the cloud, a plurality of computing devices such as server 210. For example, the number of servers 210 may be dynamic, e.g., virtual servers may be initiated or terminated based on demand. For example, work to be done based on input 215 may be placed in a queue of 'tasks', and, if the queue grows beyond a threshold, additional instances of server 210 may be initiated, on the cloud, to handle the load, servers may be terminated when the queue size decreases below a second threshold.

Figure 3:
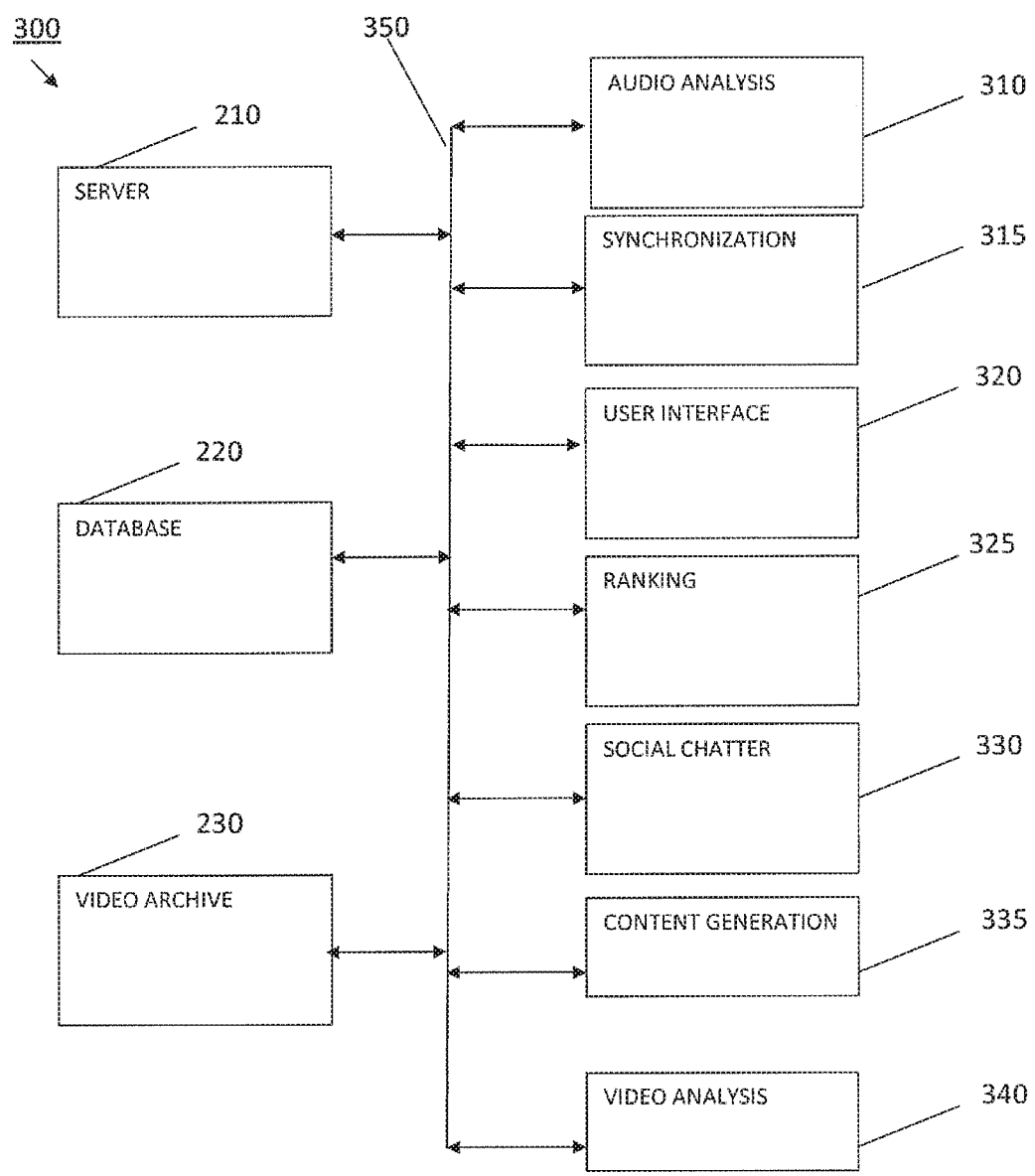
FIG. 3 shows an exemplary system according to embodiments of the invention.

Reference is made to FIG. 3 that shows a system 300 according to embodiments of the invention. As shown, system 300 may include server 210, database 220 and video archive 230 described herein. As shown, system 300 may include an audio analysis module 310, a synchronization module 315, a user interface module 320, a ranking module 325, a social chatter module 330, a content generation unit 335 and a video analysis unit 340. As shown, system 300 may include a network 350 that may enable server 210, database 220, video archive 230, audio analysis module 310, synchronization module 315, user interface module 320, ranking module 325, social chatter module 330, content generation unit 335 and video analysis unit 340 to communicate with one another. For example, some of the modules shown in FIG. 3 may be remote and may communicate with other components of system 300 over a network. For example, network 350 may be the internet or a local area network (LAN). In some embodiments or other configurations, some, or even all of, audio analysis module 310, synchronization module 315, user interface module 320, ranking module 325, social chatter module 330, content generation unit 335 and video analysis unit 340 may be included in server 210. Accordingly, methods described herein may be performed by a server, e.g., server 210 may receive an input video content; analyze the input video content to produce an analysis result; identify, based on the analysis result, an event captured in the input video content; determine a start time and an end time of a segment of the input video content, the segment including the event; and server 210 may generate an output video content by including the segment in the output video content.

For example, in some embodiments, some (or even all) of: audio analysis module 310, synchronization module 315, user interface module 320, ranking module 325, social chatter module 330, content generation unit 335 and video analysis 340 may be included in, or operatively connected to, server 210. For example, server 210 may be, or may include one or more devices similar to device 100 and modules audio analysis module 310, synchronization module 315, user interface module 320, ranking module 325, video analysis unit 340 and social chatter module 330 may be, or may include components of, a device such as computing device 100.

Audio analysis module 310, synchronization module 315, user interface module 320, ranking module 325, social chatter module 330, content generation unit 335 and video analysis 340 may be, or may include, software, hardware, firmware or any combination thereof. For example, synchronization module 315 may be an application-specific integrated circuit (ASIC) board or chip installed in server 210, ranking module 325 may a component installed in server 210 that includes a field-programmable gate array (FPGA) component as known in the art and so on.

Synchronization module 315 or server 210 may perform automatic identification of events (sports and none-sport) on video broadcast and may automatically synchronize metadata with video content. In some embodiments, synchronization of events, metadata and/or audio content with a video clip includes associating data objects (e.g., event and metadata objects described herein) with specific times, segments or portions of a video clip. For example, to synchronize an event with a video clip, an event object that includes information related to the event is associated with a segment of the video clip. In some embodiments, a pointer or other reference to a segment of a video clip is included in, or associate with, an event object that includes information related to the event. Event objects are further described herein, for example, with reference to event objects 415 and 452 shown in FIG. 4.

Generally, events as referred to herein relate to events that occur or happen in reality. For example, a point scored or a "touchdown" in a football game may be an event. An event object as referred to herein may be any object or construct that stores information related to an event. For example, an event object generated by a system or method according to embodiments of the present invention may be an object in memory (e.g., volatile memory, disk etc.) that stores or includes information related to the event. For example, an event object may include the time of the event, the duration of the event, the respected time in the video file that shows the event, etc. An event object may include metadata related to the event, e.g., any data or information that describes the event may be included in an event object. Metadata as referred to herein may be any data related to, or describing an event.

In some embodiments, synchronization module 315 indexes input video and received events' information according to time of arrival to server 210. For example, time stamps are associated with metadata, audio content and video content received at server 210. An initial synchronization process or method according to some embodiments may include identifying time stamps of events described in a metadata feed, generating events objects for events and synchronizing the events objects with a respected time in a video feed being archived. For example, information in a metadata feed describing an event may be included in an event object that may be associated with a video clip based on the time of arrival or reception of the information. An initial synchronization process may associate every event with an estimated 'start-time' and 'end-time', according to the time-stamp and event type, or according to other indications. For example, a 'start-time' and 'end-time' in an event object may be set according to estimated start and end times.

Metadata of, associated with, or related to a video clip may be stored in metadata objects. Metadata objects as referred to herein may be any suitable data structure or construct that enables storing, retrieving and modifying values. For example, metadata objects may be files or entries in a list stored in database 220. For example, database 220 may be or may include a Structured Query Language (SQL) database or other types of database systems, e.g., a NoSQL database as known in the art.

A metadata object may include a number of fields that can be modified, set or cleared. A metadata object may include a number of pointers or time stamps that associate the metadata object with a segment of a video clip.

Event objects as referred to herein may be any suitable data structure or construct that enables storing, retrieving and modifying values. For example, an event object may be a file or entry in a list stored in database 220. An event object may include a number of fields that can be modified, set or cleared. An event object may include, or be associated with, a number of pointers or time stamps that associate the event object with a segment of a video clip. For example, an event object may include a start time and an end time that indicate when (with respect to a video clip) the relevant actual event started and ended. Events described in event objects may overlap in time, for example the start time of a first event may be after the start time of a second event but before the end time of the second event.

In an embodiment, synchronization, association or correlation of event objects and metadata with a video clip may be done by setting pointers that link event objects or metadata with a time or segment in the video clip. For example, pointers that link event objects and/or metadata objects with a time or segment in the video clip may be set to synchronize events and metadata with the clip. In another embodiment, synchronization, association or correlation of an event and/or metadata object with a video clip is done by entering values (e.g., time stamp such as "second 23 from start of video") into an event or metadata object. In an embodiment, information in an event object may be used for clipping a segment of a source video to a separate video file that is related to the event described by, or in, the event object (and may be related to additional events or event objects as well). For example, using a start and end time of an event (e.g., as indicated in an associated or related event object), a segment may be clipped out of a source or input video clip.

Figure 4:
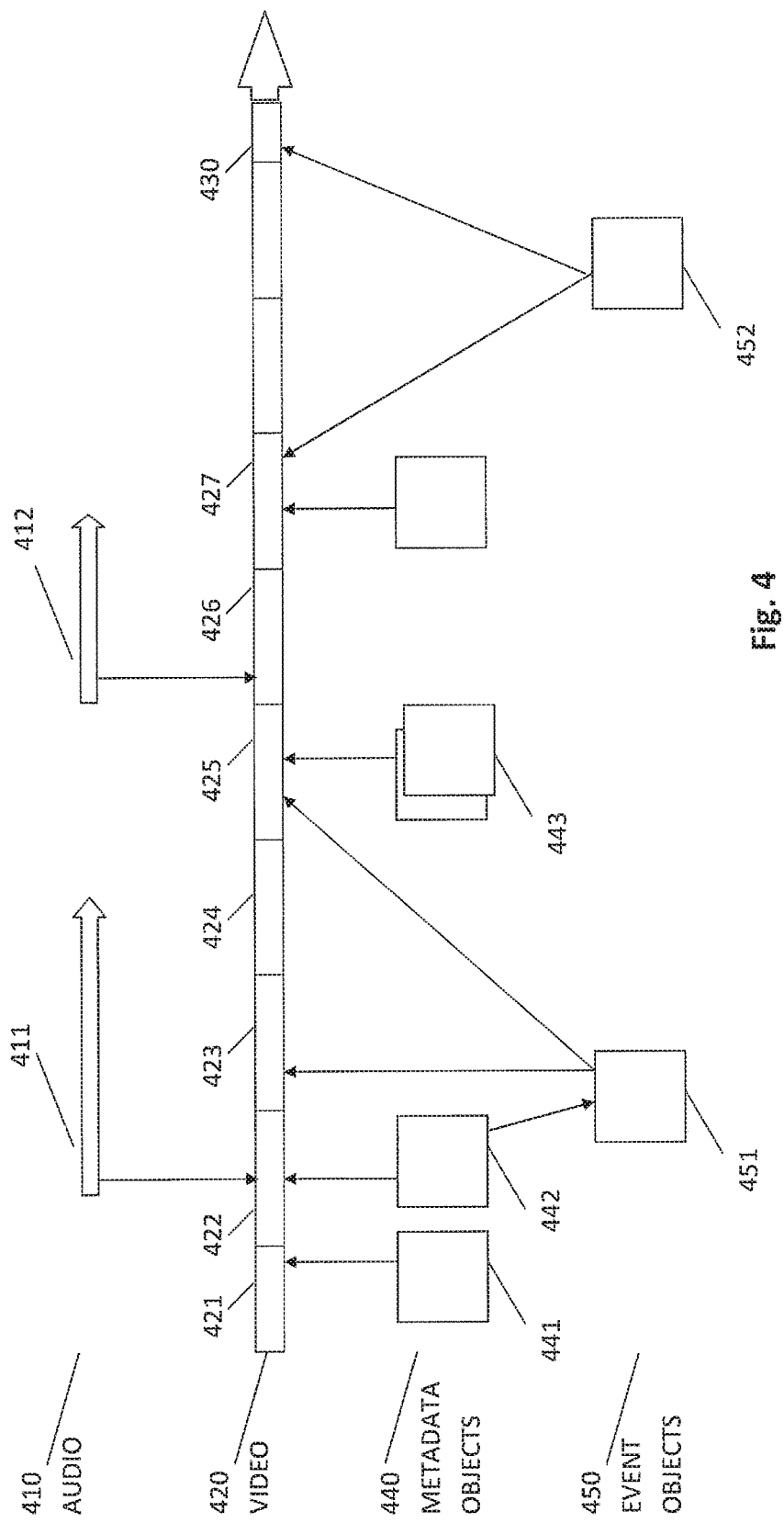
FIG. 4 illustrates a synchronization of metadata objects, event objects and audio content with a video clip according to embodiments of the invention.

Reference is additionally made to FIG. 4 that illustrates a synchronization of metadata, events and audio content with a video clip. In some embodiments of the invention, synchronization of metadata, events and audio content with a video clip may be performed and/or achieved by including metadata into metadata objects and by using metadata and audio content to create event objects. Metadata objects and event objects may be synchronized with a video clip, e.g., by associating metadata objects and event objects with segments or with a time in a video clip. For example, video 420 may be time indexed and metadata objects and event objects may be associated with specific indices or time slots of a video clip. Any relevant information may be included in event objects and/or metadata objects. For example, metadata received in input 215 as described herein may be included in event objects and/or metadata objects. Metadata may be information received (e.g., included in input 215) or it may be information generated by a system or method. For example, based on analysis of audio content, metadata such as when an event actually occurred, who is the player that scored a point and so on may be deduced and metadata reflecting such deduction may be included in metadata objects and/or event objects. For example, metadata may be information generated based on video and image analysis or it may be information received as an input from a user interface system 320.

As shown by segments 421, 422, 423, 424, 425, 426, 427 and 430, time segments in video 420 may be identified and marked. For example, segments 421, 422 and so on may represent seconds, minutes or milliseconds. Any time resolution may be used to time index a video clip. Audio content, events and metadata may be associated, synchronized or correlated with a video clip according to any time resolution. As shown by metadata objects 441, 442 and 443, metadata related to video clip 420 may be included in metadata objects that may be associated with portions, segments or time slots in video 420. Metadata related to video clip 420 may be included in metadata objects that may be included in, or point to, event objects.

In some embodiments, a metadata object may point to a specific time or moment in a video clip (e.g., by being associated with a specific second, moment or offset from a beginning of/in a game). For example a metadata object of a 'start-time' may point to a specific moment. In some embodiments, a metadata object may point to, or be associated with, an event, e.g., in the same way an event object is associated with an event as described herein. For example, a metadata object for an even such as 'Dunk', may point to, or be associated with, an entire event (e.g., the metadata object is associate with an entire segment that shows an event, from start-time to end-time). For example, to associate a metadata object with an event, the metadata object may be associated with an event object. For example and as shown, metadata object 442 may point to (thus be associated with) event object 451 such that any metadata in metadata object 442 is associated with the event described by event object 451. A single metadata object may be associated with a number of event objects and single event object may be associated with a number of metadata objects. As shown (e.g., by the arrows extending from metadata object 442), a metadata object may be associated with an event object and with a segment or time slot of a video. Although not shown, an event object may be associated with a number of metadata objects and with one or more segments or time slots of a video. Generally, any object (e.g., event object and metadata object) may be associated with any number of other objects (e.g., with one or more event or metadata objects) as well as with one or more segments or time slots of a video or audio stream (e.g., audio segment 411). For the sake of clarity and simplicity, not all possible associations are shown in FIG. 4, however, it will be understood that any element shown in FIG. 4 may be associated with any one or more elements shown in FIG. 4 using pointers or other techniques as described herein.

As shown by event objects 450, events may be identified and may be associated with video 420. An event object may be associated with a start and an end time. A start and end time may be associated with an event object. For example, an object representing an event may include a start and an end time of the event. For example and as shown, an event described by event object 451 may have a start time that is segment 423 of video 420 and an end time that is segment 425 of video 420. Similarly, event object 452 starts at time or segment 427 and ends at time or segment 430. Although shown as pointing to a segment, a start and end time may be an absolute value, e.g., a specific second in a video clip, e.g., the number of seconds elapsed since the start of the video clip (e.g., an offset as known in the art). For example, the start and end time may be a time offset from the start of a video clip and may point to a specific frame in the video.

Events may be identified in a video clip, e.g., based on related metadata or based on processing the video content (e.g., by video analysis unit 340). Events may be identified based on processing audio content (e.g., processing a video's audio track or a radio broadcast by audio analysis unit 310). As described, an event object may include values, pointers, definitions, parameters and categories. For example, different event categories or types may be defined for different sports and event objects may be associated with categories (e.g., in basketball, event type could be '3-point basket', event parameters could be 'made' or 'missed', additional descriptions can be 'off the dribble' or 'catch and shoot'. Other event types in basketball could be 'foul', 'assist', 'rebound', etc.). As described, two or more event objects may be associated with overlapping or even same portion or segment of a video clip thus reflecting an overlap in time of actual events. For example, two events occurring in second 425 of video 420 may be represented by two event objects as shown in FIG. 4.

In some embodiments, an initial synchronization may include determining the time of an event with respect to a video clip and correlating the event with the video clip. For example, synchronization may include determining a time of an event with respect to the start time of the clip, or it may be, or based on, another measure of time within the clip. An initial synchronization adjustment may pre-set the synchronization for all events according to it. For example, based on the time an event is received, identified or determined, an event object that describes the event is correlated with the video. An initial synchronization may include correlating metadata with a video, e.g., based on arrival time of the metadata or based on the time the metadata was received by server 210. An initial synchronization may include adjustment of the offset of the start-time and end-time of all other events (or event objects) according to synchronization information or input. An initial synchronization adjustment of all events may be done by video analysis, graphics analysis, external data inputs, crowd-sourced data, manual inputs, or in any other manner.

Synchronization unit or module 315 may perform fine tuning of a synchronization, association or correlation of events, metadata and/or audio content with a video clip, e.g., by adjusting association of event objects and metadata objects with a video clip. Fine tuning of a synchronization, association or correlation may include adjusting pointers that link an event object with the video clip or it may include modifying data in the event object. For example, data that indicates the start and end time of an event may be included in an object that represents the event as described, accordingly, the data may be modified in order to fine tune the correlation of the event time with the video clip. For example, based on an initial synchronization (e.g., based on time of arrival of data related to an event at server 210), a start time of the event may be set, in an event object, to second 23 of the video clip (e.g., measured from the start of the clip). Next, based on fine tuning as described herein, the start time of the event may be set to second 26 of the video clip. Setting the start (and end) time of the event may be done using pointers or modifying data in an event object as described herein. Fine tuning may be based on output received from audio analysis unit 310. For example, based on the sound (e.g., roar) of a crowd in a game identified by audio analysis unit 310, the time a score was actually made may be determined and events or metadata objects may be adjusted accordingly. Audio data used as described may be radio audio (e.g., in a recorded or live radio show) or audio included in a video clip. For example, text to speech processing or techniques may be used to process audio data in order to determine events, time related aspects and the like. Closed-captions are generally textual content overlaid on a presentation of multimedia, e.g., subtitles as known in the art. Text analysis of closed-captions may be used to identify events, generate metadata objects and/or fine tune an initial synchronization. Video detection, image processing, video processing, graphics analysis, replay identification and detection, audio analysis and detection may be used by system 300 to create accurate pointers that link events to segments of a video clip. For example, an event may be or may include a free kick in a soccer game. Based on arrival of data indicating the free kick, an initial time for the event may be set to second 127 of the game. However, in a process of fine tuning, an audio analysis or video detection may reveal that the time of the free kick was actually second 118 into the game. Accordingly, the start time of the event may be changed to second 118. For example, pointers (e.g., as illustrated by the arrows extending from event object 451) may be modified in a fine tuning process.

A fine tuning process may use several technologies and algorithms to fine-tune the synchronization of events such that they are correlated with the right time in the related video clip. A fine tuning process may create new events that do (or did) not originally exist, or that were not originally set based on an incoming data feed. For example, based on video processing, graphics analysis, replay identification and detection or audio analysis, synchronization module 315 may identify an event that was previously unknown (e.g., was not reported to, or received by, server 210). A fine tuning process may include analyzing the video to improve the accuracy and content of events and metadata of the video clip. For example, every frame or group of frames (or any time period in the videos) may go through several processing algorithms. A fine tuning process may examine and process the entire video, a specific sequence of frames, or each frame in the video.

In some embodiments, a fine tuning process may use image processing, optical character recognition (OCR) or any other graphics analysis methods to identify the graphics of sports broadcasting competitions. For example, graphics analysis may be used to determine the minute & second of events in a game according to the graphics of a clock shown in a video clip.

Image processing may be done using comparison to a pre-known graphics kit. For example, database may include images of players and a process may identify players in a video based on stored images. Graphics analysis may be used to identify other events in the video, such as points scored, player stats, players involved in an event, type of event happening, etc. Combined with data stored in database 220, information produced using graphics analysis may be to understand types of indications, texts and numbers, appearing in a video of video clip, e.g., a video clip in a broadcast of a sports event. It should be appreciated that image processing may also be done without using pre-known graphics.

Image processing and video detection may be used (e.g., by video analysis unit 340 and synchronization module 315) to identify players, using face recognition and jersey number recognition. Synchronization module 315 may use third party solutions or in-house solutions. Face recognition may be done by comparison to images stored, in advance, in database, or by comparison to other data from the video clip. For example, using image processing results, synchronization module 315 may identify a player in a frame is same player seen in a previous frame. Images or other data stored in advance may come from any source, e.g., the internet. For example, an image of a player may be obtained from the internet, stored in database 220 and subsequently used by synchronization module 315 to identify the player in a video clip.

Video processing and video analysis may be used, e.g., by video analysis unit 340, to identify things happening on the court. For example, the area on the court may be identified by the field marks, player positions, or any other data that can be extracted from the video clip.

Replay Identification may be used by synchronization module 315 to determine or identify a 'start-time' and 'end-time' of a replay. Replay slow-motion may be identified using, for example, the Hidden Markov Model (HMM) known in the art or for example, replay can be identified using frame comparisons or the video or of the broadcast graphics to indicate the replay. Replay Identification may identify slow-motion and replays. A "replay" event may be created based on identifying a replay. For example, an event object described herein may include a type field or attribute and, based on identifying a replay, an event may be created and its type may be set to "replay".

Synchronization module 315 may use audio analysis to detect when a commentator speaks, shouts, or is silent. Synchronization module 315 may use audio analysis to better determine the 'start-time' and 'end-time' of events. Speech to Text and text analysis may be used, e.g., by synchronization module 315 in order to synchronize events with a video clip. For example, if a commentator specifically indicates a time of an event that occurred in a game then synchronization module 315 may modify an associated event object (e.g., adjust a time reference or a pointer in the event object) such that the event object is associated with the time of the event.

In some embodiments, a system may include a user interface module 320 as shown. User interface module 320 may provide a graphical user interface (GUI) usable by a user to modify any data such as metadata in metadata objects, events and other data, e.g., stored in database 220. For example, quality control may be supported by user interface module 320 that may enable a user or expert to manually modify events or metadata or create and store new events or metadata for a video clip.

For example, user interface module 320 may enable a user to adjust event data and time-pointers in case needed. User interface module 320 may sort events according to any rule or criteria and may present events of a video clip to a user according to any sorting rule or criteria. For example, events may be sorted and displayed by importance, such that high-profile events are shown first or at the top. User interface module 320 may present events or metadata in real-time, as they are received by server 210 or as they are created as described herein.

By providing an interface as described, user interface module 320 enables a user to make sure that there are no mistakes in the automated processes of creating and identifying events and metadata. User interface module 320 may receive input from a user and may modify or create events, metadata or other information in database 220. Accordingly, user interface module 320 enables a quality control process that receives input from a user and modifies metadata and events.

User interface module 320 may provide a web-based interface that shows the events and their video, date and time of synchronization to the video as they are identified by an automated process described herein. User interface module 320 may provide a management console that enables a user or operator to watch every event and adjust the event, video, data and time pointers, in order to correct any faults that may have occurred.

User interface module 320 may present events on a display, screen or console as they happen, or by a pre-determined order. For example, user interface module 320 may provide a management console that may track only a specific game being analyzed and presents the events appearing chronologically, or user interface module 320 may present, on a display, events of many different games being analyzed at the same time. Events may be presented in order of importance, having the more crucial types of events appear first. A management console may enable a quality control manager to confirm an event, remove an event and so on. User interface module 320 may interact with database 220 and may modify any data therein. For example, based on input from a quality manager, user interface module 320 may delete an event object or a metadata object, may modify a start time of an event and so on.

User interface module 320 may enable quality control to be done by crowd-sourcing. In some embodiments, a first instance of user interface unit 320 may enable users to interact with a system as described and a second instance of user interface unit 320 may enable quality control as described. For example, user interface module 320 may present a video clip and associated events and metadata on the internet and may receive input from internet users or sports fans. Based on input from sports fan or other users, user interface module 320 may correct faults in the data or time stamping of the video. For example, user interface module 320 may access database 220 and modify any data therein based on input received from a crowd such as internet users.

User interface module 320 may provide a web-based interface or it may interact with users via another method, e.g., a mobile or tablet application, enabling users of such devices to view a video clip and associated events. User interface module 320 may enable users on any device to provide input (e.g., correction of events data). Presenting a video and related events and metadata by user interface module 320 may be done for free for sports fan's enjoyment, or for payment, or for physical or virtual rewards. For example, user interface module 320 may use elements of game playing (known in the art as gamification) to receive input from users.

Ranking unit or module 325 may rank events according to preconfigured rules, thresholds or criteria. Ranking unit or module 325 may modify or create metadata and events in database 220. For example, an object storing event data may include a rank level (e.g., a number between 1 and 5) and ranking unit 325 may modify the rank of an event by changing the rank in the event object. Ranking unit or module 325 may rank events according to input received from users (e.g., manual input provided through user interface unit 320), sequence analysis, crowd sourcing, audio analysis, social chatter analysis and or video analysis as further described herein.

Ranking unit or module 325 may examine audio content (e.g., a broadcast of a game on the radio received as input by server 210 or the audio track of a video clip) and may rank events based on the audio content. For example, an event may be ranked high if the commentator shouts or the crowd noise is high when the event occurs. Ranking unit or module 325 may rank events according to a sequence of a game, for example, an event that includes a score that results in a tie may be ranked higher than other scores. Ranking unit or module 325 may rank events according to social chatter. For example, social chatter unit 330 may monitor social media or platforms such as Tweeter or Facebook and inform ranking unit or module 325 of the level or type of chatter and ranking unit or module 325 may associate a high rank with an event according to the social chatter.

Generally, a rank may indicate an importance of an event. Otherwise described, a rank may define which events are more important, more interesting, or more beautiful to watch. Events may be sorted based on a rank. For example, to sort events based on importance, the rank values of events may be examined and the events may be sorted (and presented or provided) according to their rank level or value. For example, user interface unit 320 may use the rank values set by ranking unit 325 in order to present events to a user based on their rank.

Ranking unit 325 may use data from any source to rank events. For example, ranking unit 325 may use data from a data provider or from the internet that includes social chatter and fans' comments related to the event. The ranking module may use the event object database to determine the ranking of events by using an algorithm that may define certain events as more important. For example, a 3-point shot made in the last 3 seconds of a game that wins the game may get a high rank. The ranking module may use the audio track to determine a higher ranking by the high volume of the crowd or the commentator. The ranking module may analyze social chatter texts talking about a certain event and give it a higher ranking according to social comments. Ranking unit 325 may receive input form a user and rank events according to the input. User interface unit 320 may enable a user to rank events and ranking unit 325 may receive user input from user interface 320 and rank events according to the input. A quality manager or personnel may set or modify ranks, e.g., using user interface unit 320. In another case or embodiment, an administrator may provide event data that, when identified in a segment of a video clip, causes a system or method according to some embodiments to associate a high rank with the segment as described.

Ranking unit 325 may set or modify a rank of an event by analyzing a sequence of events in a game. For example, a crucial 3-pointer in a close basketball game close to the end of the $4^{th}$ quarter may be identified as important by ranking unit 325 that may accordingly set a high rank for the event.

Various other indications may be used by ranking unit 325 to identify the more important and exciting events or moments. For example, indication of an important event may be the level of the volume of a commentator. For example, if the commentator shouts, the event is determined, by ranking unit 325, as likely to be important, interesting or beautiful, and ranking unit 325 may therefore set a high rank for the event. In another case, the level of the crowd noise may be used by ranking unit 325 to determine the ranking of an event.

Ranking unit 325 may set a rank based on analysis of social media chatter related to a game. For example, the amount of chatter or number of comments in social may be used to determine a rank of an event. For example, ranking unit 325 may raise a rank of an event based on the number or rate of comments in a social network related to the event. Analysis of social media content may include analyzing emotions or sentiments and based on an emotional level expressed in social platforms, a rank for an event may be set. For example, ranking unit 325 may set a high rank for an event if it is determined that users in a social network are excited about the event.

Ranking unit 325 may set a rank based on input received from users. For example, user interface unit 320 may enable users to watch a game and rank events. Ranking unit 325 may receive users' input from user interface unit 320 and may rank events based on users' input.

Social chatter unit 330 may monitor social media, for example Twitter, Facebook and the like, for posts by fans related to an ongoing sports event or other live broadcast currently being broadcasted and may analyze posts or other social media content. Output from social chatter unit 330 may be used to enrich event metadata, improve accuracy of data and refine ranking of events.

For example, social media posts and comments referring to a specific player, team, game or event may be identified and used in order to extend or create metadata for a video clip or rank events. For example, the context and content of a post and the time the post was published may be compared to an event's data and time and the event may then be modified based on the post data and time. Events that cause many comments may be deemed more important or interesting and their rank may accordingly be increased. The number of events and the sentiments expressed may be used to determine the ranking of an event.

Social chatter unit 330 may 'listen' to the chatter on the social platforms and use chatter to enrich event object metadata. For example, people's comments may contribute to a ranking of an event. In another case, social responses may be an indication of an event and social chatter unit 330 may create an event object based on social chatter.

Social chatter unit 330 may generate social media responses to comments it may analyze. Responses may include videos of an event or several events in context to the comment. For example, social chatter unit 330 may be configured to automatically post or tweet a video of certain events on a social network in a response to a certain fan comment. For example, in response to a comment by a fan saying "what a TD! Go 49ers!", the system may post a video response with the respected Touch Down (according to real-time synchronization) that may include also a textual post.

Social chatter unit 330 may generate social media content and may analyze responses to generated social media content. For example, social chatter unit 330 may be configured to automatically post comments or tweet on social network videos of certain events and may further analyze response of users to the automated comments or tweets. For example, to get input from users on an event, social chatter unit 330 may post predefined comments (designed to cause users to respond) such as "did you see that move?" or "what just happened?". After posting a comment, social chatter unit 330 may monitor users' responses and a system may use the responses to update or create metadata or events as described herein.

User interface unit 320 may be configured to access and modify data in database 220. User interface unit 320 may be configured to modify or delete data in database 220, or add data thereto. User interface unit 320 may manipulate a video clip, metadata and events in database 220. Accordingly, any data in database 220 may be manipulated by user interface unit 320 as described herein.

User interface unit 320 may manipulate data in database 220 based on input from a user, for example, user interface unit 320 may provide a web-based interface, e.g., enabling a user to interact with system 300 using a web browser as known in the art. Accordingly, user interface unit 320 may be used by users to create, edit and publish video clips. User interface unit 320 may enable users to directly access any data on database 220. For example, using user interface unit 320, a user may copy one or more of metadata objects 440 associated with a first video clip and associate the copied metadata objects with another video clip. User interface unit 320 may enable users to change pointers such that an event associated with a first time slot of a video is associated with another, different time slot (thus effectively correcting the time of the event). For example, based on user input, user interface unit 320 may change the pointer from event object 451 such that the end time of the relevant event is not time slot 425 but time slot 426. User interface unit 320 may enable users to modify data in metadata object. For example, if a name of a player as included in metadata object 442 is wrong, a user may correct the name.

User interface unit 320 may operate in a number of modes or capacities. For example, in a first mode, user interface unit 320 may serve users as described and in a second mode, user interface unit 320 may enable an administrator or professional to upload content, execute quality control or otherwise manage a system. According to some embodiments, a system may include a number of instances of user interface unit 320 operating in different modes or capacities. User interface unit 320 may present a list of video clips to a user and enable a user to pick a clip or create new clips, e.g., by joining together two or more clips as described herein or by using an online video editing interface.

Creating new clips may be done using an online editing engine or unit. For example, content generation unit 335 may use an online editing unit or engine. An online editing engine may be adapted to take several videos and edit them, stitch them together, insert or apply video effects, transitions, add soundtracks, intros and endings and the like. An online editing engine may be a cloud-based modular video editing system that retrieves data from database 220 and uses retrieved data to create new video clips or other content. Video editing may be done automatically by an algorithm or a method, or may be initiated by a user using user interface 320.

User interface unit 320 may enable a user to publish videos directly to digital platforms through an existing integration with publishing platforms. For example, based on input from a user, user interface unit 320 may upload a selected video clip to a social network or platform, e.g., to Twitter, Facebook, YouTube and the like. For example, User interface unit 320 may cause a video clip to be uploaded from database 220 to a social network.

Figure 5:
FIG. 5 is an exemplary screenshot according to embodiments of the invention.

Reference is made to FIG. 5 that shows an exemplary screenshot of a screen that may be presented to a user according to some embodiments of the present invention. As shown, an interface may enable a user to access, modify or otherwise control metadata and events in database 220 thus enabling online, near-live, editing of clips and instant publishing. As shown, a web-based or other user interface may present events in a database with their respective metadata and video. Events may be edited with different data and video time stamps. New clips may be generated, e.g., by combining or joining a number of clips.

As shown, a user may choose to publish (e.g., provide for another's use or for general distribution or use) an event or clip directly from the platform to other digital platforms. For example, user interface unit 320 may use an Application Programming Interface (API) in order to upload a video clip to a social network as known in the art. For example, the publishing capability may upload a video to YouTube with a set of automatic and/or user generated parameters. A video clip may also be Twitted in real time using a proprietary video player, or a standard or third-party video player, or players such as YouTube or online video platforms such as Brightcove, Ooyala and Kaltura that host video files and play them. The publication may be to a specially made account, or to a common social media account or platform that may be used by the user/customer.

As shown by buttons 530, a user may select a social network and upload a video clip to the selected social network. As shown by input fields and buttons 525, a user may change various parameters of a clip. As shown by filters area, a user may search for clips using various parameters such as time, events and the like. As shown by events 515, events related to video clips may be presented and selected by a user. As shown by live editing 520, a user may create his or her own video, e.g., by joining two or more clips, adding or editing events, adding or editing metadata for the clip etc. For example, a user can associate a name and description with an event and publish the video and event as described.

User interface unit 320 may enable a user to pick several events and stitch them together into one clip. This may be enabled within the user interface with a simplified online-editing interface that enables joining two or more video clips to create the new clip. User interface unit 320 may enable to add or edit the soundtrack of the events and clips. It may also enable to create video effects to the clip. User interface unit 320 may enable to add intros (sting) and outros (slate) to a video. In some embodiments, user interface unit 320 operates as an interface between a user and a back-end module or engine that can do online editing (unit 335), e.g., user interface unit 320 may enable a user to interact with, or provide input to, content generation unit 335 and/or an online editing engine described herein. An online editing engine or system may be programmed to create clips on its own, or automatically, e.g., without any input from a user, based on an algorithm or method, or based on pre-determined definitions or time-frames (e.g., create a daily clip with all the 'Dunk' event videos).

User interface unit 320 may enable a user to create new events and manually associate metadata with events, e.g., a name, description, tags and thumbnails. User interface unit 320 may enable a user to associate an event with a start time and an end time. Newly created events may be published or edited using user interface unit 320. Any event, newly created event, or edited clip, may be searched and found, using user interface unit 320. For example, user interface unit 320 may enable performing textual search in metadata, time based search, filtering events and the like. User interface unit 320 may interact with any unit or module, e.g., any one of the units shown in FIG. 3 and described herein. Accordingly, any input to units in system 300 may be provided via user interface unit 320 and any output generated by units of system 300 may be provided by user interface unit 320. For example, any file or content object that includes information related to sport events (e.g., a video stored in a database) may be accessed using user interface unit 320. Where applicable, any content object or file related to sports events in a database may be played live or archived, and used in any such way as described to create newly created clips, find existing clips, edit and publish them.

Content generation unit 335 may automatically create or generate new video clips according to pre-defined rules for production. Content generation unit 335 may automatically identify highlights, for example, based on conditions or statistical thresholds. For example, a new video clip may be created from all of the baskets of a player that scored more than 25 points in a game. Content generation unit 335 may include, or may interact with, an online editing system or unit, e.g., an online editing engine as described herein. Content generation unit 335 may automatically create or generate new video clips according to input from a user. For example, content generation unit 335 may receive input from a user and create video clips as described with reference to FIG. 5.

A new video clip may be or may include a 'storyline' for different sports in order to create relevant, professional and interesting highlight packages, telling the story of the game. Content generation unit 335 may create a 'condensed' game. Rules and conditions may be used cross-games, enabling content generation unit 335 to create daily, weekly, monthly and seasonal videos. Content generation unit 335 may use the ranking method described herein. For example, segments included in a storyline or condensed video may be chosen based on their ranks.

Content generation unit 335 may categorize events representing important moments in the video that correlate to statistics of the sports. For example, the number of scores may be a threshold, accordingly, a player that scores more than 25 points in a single basketball game may meet to a threshold that may define how to create a highlight video of that player's events in that specific game. Another example may be a close game that ended with a winning buzzer-shot, content generation unit 335 may create a video highlight telling the 'story' of the game, picking the crucial baskets and the important moments of transitions in the game and create an interesting clip.

Content generation unit 335 may create video clips of different lengths telling the stories. A shorter clip may have different events or neglect some of the ones inserted into a longer clip, e.g., according to the importance (or rank) of each event. For example, content generation unit 335 uses the ranking of each event in order to determine whether or not the event will be included in a summary or storyline clip. Content generation unit 335 may create 'condensed' video clips, that may be longer highlight clips showing every important play in the game, essentially 'condensing' the entire game into a short clip (for example, an entire basketball game with every basket and important moment in a 12-minute clip).

An embodiment of a system and method may examine or analyze textual or other information or content, create a video clip based on the content of the analyzed information and include the created video clip in the text or content. For example, content generation unit 335 or another unit in system 300 may use textual analysis or Natural language processing (NLP) in order to extract key parameters such as people, athletes, events, sports games, objects, meanings, in text posts and articles and determine the context of parameters. Content generation unit 335 may compare extracted data with events and metadata in database 220, in real-time, and may create matching and relevant videos. Videos produced may be placed, or included in the text posts or articles, social and blog posts. Accordingly, according to some embodiments, a system and method may include video clips in textual or other information based on the content, meaning or context of the textual or other content.

Any text analysis system or method may be used to identify parameters and objects in the text, such as references to a sports game, or sports athletes, a certain event, or a team. A context may be determined. For example, it may be determined if the text is a description of a game, a description of a social life of a player and so on. Analyzing text or content (e.g., content in web pages) may be done by a crawler as known in the art, a plug-in installed in a web browser, or any other method. Any content may be applicable. For example, content such as web pages, blogs and social media posts may be analyzed as described herein, video clips may be created based on the analysis and the created video clips may be inserted, included or planted in the analyzed content.

Video playback of a video inserted into content as described herein may be done using a standardized player, proprietary player, or an online video platform. Videos may be syndicated to many websites or social media platforms using a widget or a plug-in to analyze and embed (e.g. insert or implant) video players with related videos. For example, a video may be embedded into a video player by having a widget or other software module included in the video player.

Figure 6:
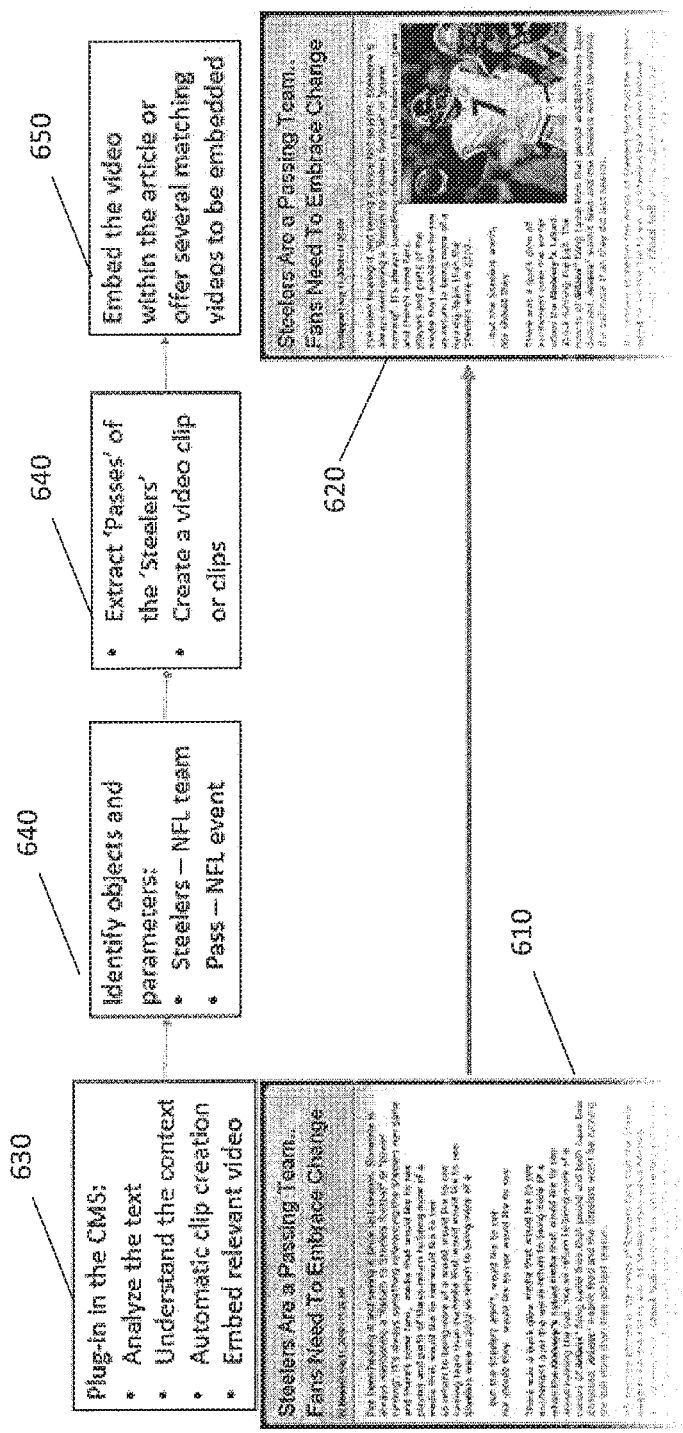
FIG. 6 shows embedding content according to embodiments of the invention.

Reference is made to FIG. 6, illustrating an automated method of including a video clip in textual content according to an embodiment of the present invention. As shown, an original textual content 610 may be converted to, or replaced by, a new content 620 by inserting a video clip into original textual content 610. As shown by block 630, a module or plug-in may analyze text in the original content (e.g., a web page), understand or determine the context, create a video clip and embed the video clip in the original content object. As shown by block 640, an embodiment of a method may include identifying objects and parameters in the original content. As shown by block 640, embodiments of a method may include extracting or identifying specific terms in the original content and using identified or extracted terms to create a video clip. As shown by block 650, embodiments of a method may include embedding a video clip in the original content. For example and as shown, the original content may be rearranged so that the video clip fits into the original content.

Audio analysis module 310 may for example analyze sports commentators' speech. Audio analysis module 310 may extract play-by-play and descriptions from radio or television (TV) broadcasts of sports games. Audio analysis module 310 may identify or determine sequences of events (e.g., play-by-play sequences) using speech-to-text technology. According to some embodiments a system and method may use commentators' broadcast description to create or update events and ranking described herein.

Speech to text technology may be used (e.g., by audio analysis module 310) to identify events in sports broadcasts and enrich the metadata of event. For example, audio tracks and broadcasts from TV and Radio stations provided as shown by input 210 may be analyzed. A transcript of a broadcast may be created. In some embodiments, transcripts may be acquired by capturing the closed-captioned feed in a TV broadcasts, e.g., in cases where closed-captioned feed includes a transcript of everything said in the broadcast.

A commentator describing a game may specify players' names, scores, and events happening in the game. Accordingly, a transcript may include a play-by-play story of the game that fully describes the actual sequence of events and timing as well as metadata such as scores, players' actions and the like. Textual analysis (performed by a dedicated unit in system 300) applied to a transcript may identify events and their metadata.

Data obtained using audio input or content as described herein may be used to create events and metadata as described herein. Data obtained using audio input and audio processing as described herein may be used to improve the accuracy events, identify mistakes and support the quality control process. For example, the start time of an event described by event object 452 may originally be set to time slot 426. However, based on a comment of a commentator, it may be determined that the event actually occurred at time slot 427 and the start time of the event may accordingly be modified.

Social chatter unit 330 may obtain input from users and input from users may be used to create or update events and metadata. Collecting input from users may be referred to herein as crowdsourcing. Crowdsourcing enables users (e.g., sports fans) to watch events using a lucrative interface (web-based, app, mobile, or a connected TV) and provide input that may be used for creating events and metadata described herein. Crowdsourcing may be used in ranking events and metadata as described herein. For example, users watching a game may indicate a name of a player, a time of a score or any type of data associated with a game or event. User may also rank an event.

User interface 320 may provide a gamified interface that gives, tasks and points to users. Users may contribute for mere enjoyment, or may be trying to achieve a goal. Incentives or rewards may be virtual goods, physical goods, or even payment. Crowd-sourcing interfaces included in system 300 may be web-based interfaces, desktop or laptop interfaces, tablet or mobile interfaces, smart-TV interfaces, or any other interface. Input from users may be collected in real-time, e.g., input related to a game may be obtained from users while the game is in progress. In other cases, input from users may be obtained with respect to an archived game.

An embodiment of a system and method may automatically create a personalized video for fantasy sports players, summarizing each fantasy team's highlights and results. For example, according to some embodiments, a system and method may create a video clip that includes a personal highlight real according to a team's roster or team's statistics.

An embodiment of a system and method may create a video that includes graphics that creates a personalized video with a tailor made automatic narration for each fan. For example, a personalized video created by a system, according to some embodiments, may include an overview of the fan's personal fantasy league team's current results. For example, an online editing engine described herein may be included in a system for creating video clips and used as described herein. Personalized narrated audio track may be generated for newly created video clips. Newly created video clips and audio content may be personalized as described herein. A video created by a system or method, according to embodiments of the present invention, may include video footage of each player in the fantasy roster. A video created as described may include a personalized audio track, shows statistics and/or it may include a personalized message or a sponsor message. For example, content generation unit 335 may use data in database 220 to create a video clip that includes video highlights for a player in a fantasy league or in a fantasy team roster.

Using data in database 220, content generation unit 335 may create a video clip that includes graphics of data and statistical information, including, for example, data from the fantasy league and the fantasy league's table. For example, an automatically created video clip may include the latest results of games, and the results in the fantasy league match-ups, winners and losers, and/or points accumulated.

An automatically created video clip may be adapted and changed for various fantasy league formats. An automatically created video clip may be adapted for different fantasy league sports. An automatically created video clip may be according to a selected theme or storyline. An automatically created video clip may be personalized. For example, a personalized or fantasy video may be a recap of recent events. An automatically created video clip may include future recommendations or statistical information for decision making, or any other information. An automatically created video clip may include the actual video highlights of players, including but not limited to the players listed in the fantasy player's roster. An automatically created video clip may show the stats of each player and his own results in the fantasy game. An automatically created video clip may show each player's performance in a video highlight as part of the video.

The graphics of an automatically created video may be rendered using After Effect, flash, or any other video technology. Rendering a video may be done using pre-determined themes and graphics that may vary in textual data and images, as well as changing video events coming from the database. Videos may be rendered using After Effect API, or any other video editing software, or by proprietary in-house editing software.

An automatically created video clip may include a personalized audio track. Audio may be pre-recorded and pieces of the track may be concatenated according to the personalized video's content as it is being generated. For example, names of the sports athletes and the fantasy players may be pre-recorded in multiple variations, numbers may be recorded, and many storyline sentences fitting the themes of the fantasy video may be pre-recorded and concatenated according to the required output. Any recorded information may be stored in database 220 and accessed or used as described herein.

An automatically created video clip may contain personalized messages to the fantasy players, including fantasy recommendations, or promotional offerings by advertisers and sponsors, or additional information. A message may be adapted and changed for each fantasy video and for each fantasy player. An automatically created fantasy video clip may be delivered to the fantasy player within a fantasy league's application or web-interface, or may be delivered separately in a dedicated application, or in a website, by e-mail, or any other way.

An input or original video may be stored or encoded according to any format. For example, input 215 may include video clips from a live feed and/or from an archiving system. Archiving systems may encode video or other content. For example, an archiving system may compress a video clip.

Compressing (or otherwise changing a format) of an original video clip is known, or referred to, as encoding. Changing the format of a video clip from a first to a second format is known in the art as transcoding. Generally, encoding and transcoding are computing-heavy processes that require examining data in each frame, performing various calculations etc. In contrast, copying segments of a video referred to in the art as 'direct-copy' is a relatively simple process that does not require substantial computing resources. Direct-copy may be used to copy a segment of a video only when beginning to copy from a key-frame as referred to in the art and explained herein. A system and method according to embodiments of the invention enable a quick and efficient process of creating a video clip form an input encoded video clip.

A system and method according to embodiments of the invention may determine a start time and an end time of an event captured in an input video content, e.g., as described herein. A system and method according to embodiments of the invention may identify, in the input video content, the first key-frame after the start time (or the key-frame closest to, or placed right after the, start time) and may encode a first segment of the input video content such that the first segment includes the start time and up to the first key-frame. A system and method according to embodiments of the invention may direct-copy a second segment of the input video content wherein the second segment includes the key-frame and the end time, and the system and method may further generate an output video content by concatenating the first and second segments.

Figure 7:
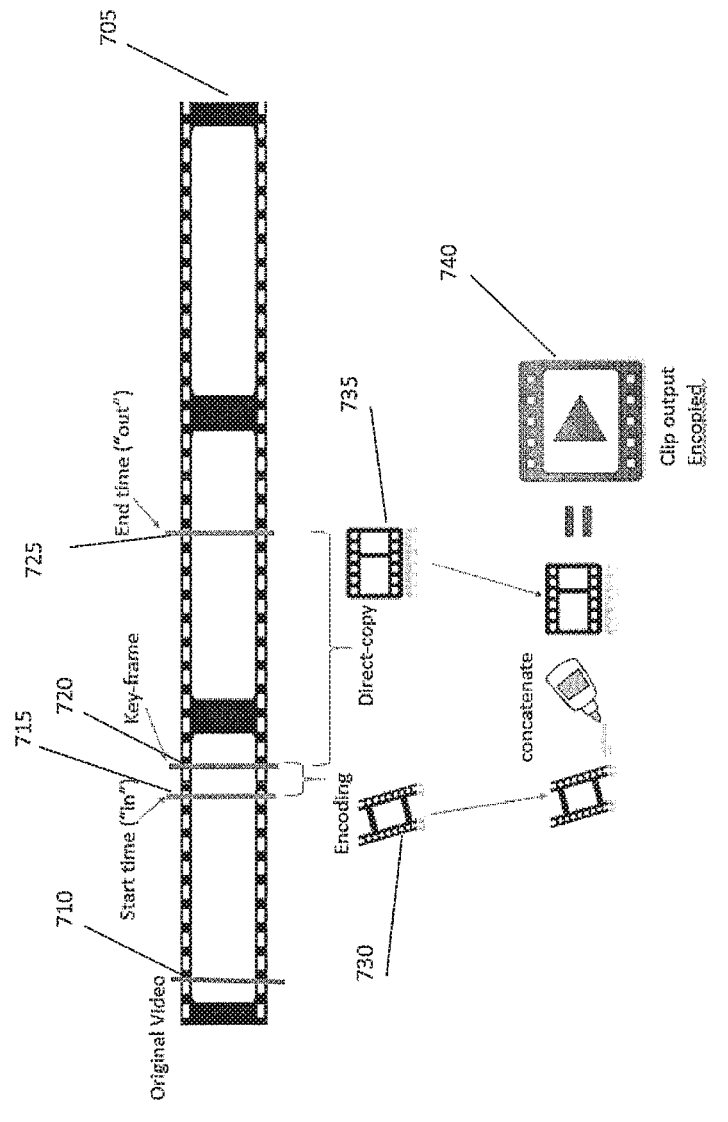
FIG. 7 shows a method of creating a video clip for an event according to embodiments of the invention.

Reference is made to FIG. 7, illustrating a method of creating a video clip for an event according to embodiments of the invention. As shown by start time 715 and end time 725, the start and end times of an event in an input video 705 may be determined. For example, input video 705 may be similar to video 420 and start and end times 715 and 725 may be the start and end times of an event described in event object 451 as described with reference to FIG. 4.

Input video 705 may be encoded using key-frames as known in the art. Generally, a key-frame may be a frame (e.g., an image frame within a video sequence or clip) used as reference such that subsequent frames in an encoded video only store changes or deltas from the key-frame. For example, a key-frame may include information for each pixel in the frame and subsequent frames only store information for pixels that changed with respect to the key-frame.

To create a video clip related to an event that starts at time 715 and ends at time 725, a method according to one embodiment of the present invention, may include identifying the key-frames nearest to the start time of the event. In some embodiments, the key-frames immediately before and after the start time are identified. According to some embodiments a method may include transcoding the segment from the start time to the nearest, next key-frame. For example, the segment from start time 715 to key-frame 720 is transformed, encoded or transcoded. For example, a new video clip or movie may be generated with a key-frame in the beginning, where frame 715 was in video 705. For example, using key-frame 710 and changes in frames from key-frame 710 to start time 715, a new key-frame may be produced and may be used as the frame at start time 715 such that an encoded segment 730 is generated. For example, the encoded segment or portion 730 may be placed in a buffer or file.

According to some embodiments a method may include direct copying the portion from the first key-frame immediately after the start time (720) to the end time (725). For example and as shown by direct copied segment 735, a portion of the input video may be copied, e.g., into a buffer or file.

To generate a video clip related to an event embodiments of a method may further include concatenating the encoded portion (e.g., portion 730) and the direct copied segment (e.g., segment 735). For example and as shown, an output video clip 740 may be produced by concatenating an encoded segment 730 and a copied segment 735.

Concatenation of segments 730 and 735 may be done using direct copy. Segments 730 and 735 may be of the exact same format and identical in every criteria of video encoding to enable direct copy to concatenate the segments into video clip 740.

Figure 8:
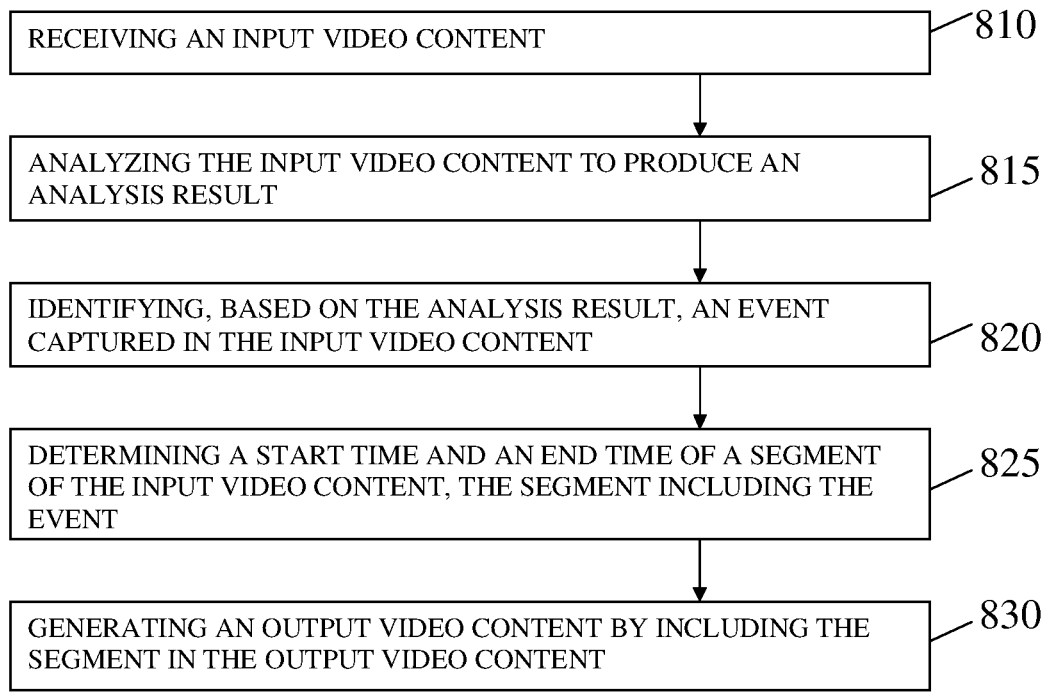
FIG. 8 shows a flow according to embodiments of the invention.

Reference is made to FIG. 8, showing a flow according to some embodiments of the invention. As shown by block 810, an input video content may be received. For example, server 210 may receive video 420 as input video content. As shown by block 815, input video content may be analyzed and an analysis result may be produced. For example, in an embodiment, an input video may be analyzed by audio analysis module 310 and an analysis result that identifies (and/or includes the time of) audio events or information (e.g., a roar of a crowd, a whistle of a referee and the like) may be produced.

In another or same embodiment, an input video may be analyzed by video analysis unit 340 and an analysis result that identifies (and/or includes the time of) events or information that can be seen in the input video (e.g., a dunk in a basketball game, a foul, a score made and the like) may be produced.

As shown by block 820, based on the analysis result, an event captured in the input video content may be identified. For example and as described, audio analysis module 310 and video analysis unit 340 may be adapted to analyze an input video content and identify events therein as described. As shown by block 825, a segment or portion (of an input video) that includes an event may be identified or determined, and a start time and an end time of the segment or portion may be determined A start time and an end time a segment or portion that includes an event may be recorded, e.g., in metadata objects 440 and/or in one or more of event objects 450 as described herein.

As shown by block 830, an output video content may be generated by including, in an output video content, a segment or portion of the input video wherein the segment or portion includes an identified event. For example, segments 421, 422 and 425 may be segments in which events were identified and segments 421, 422 and 425 may be included in an output video content.

As described herein, events identified and used for generating an output video clip or content may be events that occurred when the input video was taken, made or captured. For example, in some embodiments, events identified by analyzing the input video content as described may be a score of a game (e.g., a score of two or three points in a basketball game may be identified as an event), a movement of a player or a team (e.g., a movement of a group to a defense position, a double pass and so on may be movements that are identified as events). An appearance of an object or player, e.g., determined based on face recognition or based on the number worn on a player's uniform (also known in the art as jersey number, shirt number, sweater number, uniform number or squad number) may be an event identified, recorded and used in generating an output video as described.

In some embodiments, effects in, or modifications applied to, an input video content may be identified by analyzing the input video content. Effects in, or modifications applied to an input video content and identified (e.g., using video or other analysis) may be used in order to generate metadata and/or identify events.

For example, any one of a transition effect inserted into (or included in) the input video may be identified. In other cases, e.g., when more than one camera is used for capturing the input video, a change of the source camera used for capturing the input video may be identified. In other embodiments, any of: a close-up, a pan, tilt and/or zoom (PTZ effects) of a camera may be identified and used for generating metadata, identifying events or otherwise used for generating an output video content as described. In yet other cases, a system and method according to embodiments of the invention may identify effects, operations or other relevant information in an input video content, e.g., a widening and/or narrowing of a field of view of a camera used for capturing the input video. Accordingly, an output video may be generated based on any aspects, effects or information in the input video, e.g., information or modification applied to the input video regardless of the actual events captured by the input video. As described, the input video may include a sporting event such as a basketball game, car or horse race etc.

Effects, operations, sources and camera manipulations or operations in, of, or related to, an input video content may be identified, by embodiments of the invention, as described and the effects, operations and other elements identified may be used in order to identify events, start and/or end times of events or any other metadata related to events. For example: during a 'dunk' event in basketball, identifying or determining a scene/camera change from a wide image to a close-up on a player, may be used by server 210 to determine it is the end of the "dunk" event (e.g., the change from wide view to close-up view is a good place to 'cut' the video in order to generate a segment for the event), accordingly, based on identifying a camera effect as described, server 210 may determine the end of the "dunk" event is 1 second after the close-up begins.

In another case, identifying a camera movement to one side of the court may be determined, by server 210, to indicate an offensive play is underway. Identifying that, after the camera stops its movement, e.g., at one side of the court (in basketball for example), and then later begins movement back towards the other side of the court, server 210 may determine that an offense is over and the other team is now in an offense. Accordingly, an event (e.g., score, dunk, attack and so on) may be identified based on camera movements, field of view change and the like. In particular, start and/or end times of events may be identified and/or determined based on camera effects, movements and the like.

As described, the input video content may include audio content and analyzing the input video content to produce an analysis result may include analyzing the included audio content. For example, as known in the art, both video and audio of a game or other scene may be captured (e.g., by a camera that includes a microphone) and, accordingly, an input video content as described may include one or more embedded audio tracks that may be provided with the input video. Accordingly, embodiments of the invention may analyze audio content captured with, and/or embedded in, an input video and/or embodiments of the invention may analyze audio content captured separately from the input video, and possibly provided separately from the input video. As described, where or when needed, embodiments of the invention may synchronize audio content with an input video. For example, synchronization module 315 may synchronize an external audio track received separately from the input video such that sounds in the external audio track can be correlated with events identified in the input video.

In some embodiments, the input video may include textual content and analyzing the input video content to produce an analysis result may include analyzing the included textual content. For example, closed captions or other text may be included or embedded in the input video and video analysis unit 340 may analyze the embedded textual content in order to identify events or generate analysis results as described. For example, the terms "dunk" or "goal" may be identified in textual content embedded in input video 420 and an embodiment may identify (or search for) an event in input video 420 based on identifying such terms in embedded text. For example, an event of type "dunk" may be identified based on identifying the word "dunk" in closed captions or subtitles included in input video 420. For example, based on a category, classification, type or other information related to an input video content, a set of terms may be used for identifying events. For example, if the input video content is one of a basketball game then the term "dunk" found in textual content may cause an embodiment to identify, or search for, an event and, if the input video content is one of a soccer game then the term "goal" found in textual content may cause an embodiment to identify, or search for, an event. Accordingly, a set of terms and rules used for searching for, or identifying events, may be selected based on the input video content. Accordingly, based on a category, classification, type or other information related to an input video content (e.g., received from a user or determined by analyzing an input video content), a set of terms may be selected and the terms may be used in order to identify events. For example, a category of "basketball" may cause an invention to select terms such as "dunk" and "score", search for the selected terms in input and identify events based on finding the terms in input as described.

Textual content received and used, by embodiments of the invention as described may include structured dada. For example, structured dada may be or may include XML or JavaScript Object Notation (JSON). Structured data may include text (e.g., "dunk") and/or structured dada may include an event ID (e.g., an ID of a dunk event), in the case of an ID, server 210 may use an ID and a mapping, table or list in order to determine an event based on an ID included (or indicated) in received structured dada.

Some embodiments of the invention may receive any data related to an input video and may produce the analysis result based on analyzing the received data. Specifically, received data may be any data other than the input video. For example, received data used for producing analysis result for an input video clip or content may be audio content and/or textual content that are not included in the input video content. For example, received (also referred to herein as external) data may be structured data and free text. Free text received may be, for example, closed captions and/or a transcript. For example, in some embodiments, a transcript of a game may be obtained from the internet or from a provider of a transcript and an embodiment may synchronize the transcript with an input video and use the synchronized transcript to produce analysis results as described. In some cases, closed captions or subtitles may not require synchronizing, e.g., they may be synchronized with, and embedded in, the received input video content, in such cases, embodiments of the invention may readily analyze closed captions or subtitles to produce analysis results and/or identify events as described.

Some embodiments of the invention may identify, in an input video, a plurality of events and may, based results of analyzing the input video and a set of rules or criteria, associate the plurality of events with a respective plurality of ranks. For example, a plurality of events that include a "dunk" in a basketball game may be identified (and may be given an event type of "dunk"). Based on a first rule that indicates a first specific player, the "dunk" events that include the first specific player may be associated with higher ranks than the other "dunk" events. An embodiment may rank the same set of events differently based on different rules. For example, in the above "dunk" example, a second rule indicating or prioritizing a second, specific or different player may cause an embodiment to associate "dunk" events that include the second player with a rank that is higher than the rank of "dunk" events that include the first player. Accordingly, ranking of events may be based on a rule or based on the desired or required output video. As further described, a ranking of events may be based on a target audience of the output video and/or any other aspect related to the output video. It will be noted that the same set of events may be ranked differently based on different rules. For example, in the above exemplary "dunk" case, the same set of "dunk" events may be ranked differently based on different rules that indicate players, a time in a game, a score of the game etc. For example, a rule may cause associating a high rank to a dunk or score at the $4^{th}$ quarter and associate a lower rank to a dunk or score at the first quarter. Accordingly, ranking events may be based on rules related to players, time, score and/or any other aspect or input of a user.

Some embodiments may associate events with a rank is based on input from users. For example, if many users comment on an event in a game (e.g., in a website or social network) then an embodiment may increase the rank of the event. For example, if a specific event is mentioned frequently in a website or calls of users to a radio station then the rank of the event may be increased. In yet other embodiments, questionnaires or other methods may be used in order to receive users' input with respect to events in a game or occasion and events may be ranked based on the input.

In some embodiments, text from users (e.g., in a webpage, forums or social networks and the like) may be semantically analyzed and, based events for inclusion in an output video clip may be selected based on the semantic analysis of the text. For example, by semantically analyzing text in a webpage, an embodiment may determine that an interesting event occurred at a specific moment of a game. For example, realizing the time of: second 18 in minute 23 of a game is repeatedly mentioned in user chatter in a webpage may cause an embodiment to determine an important or interesting event occurred at the mentioned time and may further cause the embodiment to include a segment that covers the mentioned time in an output video clip created based on an input video of the game. For example, based on the above exemplary time, a segment that covers seconds 10 to 30 in minute 23 of the game may be included in an output video.

Some embodiments of the invention may produce an output video based on ranks. For example, an embodiment may generate an output video by selecting a set of event based on their respective ranks. For example, an output video may be generated by selecting for inclusion in the output video only the events with the highest ranks. In another case, if the length of the output video is known in advance, an embodiment may iteratively select for inclusion in the output video the events with the highest ranks until the length of the output video is achieved. For example, assuming the length of the output video is known to be 24 seconds, and, assuming further that an embodiment has associated, in the input video: one event having a length 12 seconds, with a rank of 9; two events having a length 4 seconds, with a rank of 7; one event having a length 4 seconds, with a rank of 5, and the embodiments associated all other events in the input video with a rank of 4 or less. In such exemplary case, in order to create an output video of length 24, an embodiment may first select to include the event with the rank of 9 in the output video, determine, based on the resulting length of the output video that more events can be included therein, select the two events with the rank of 7, determine that the resulting output video is 20 seconds long and therefore additional events may be includes, select for inclusion the event ranked 5, determine that the desired length was reached and provide the resulting output video. Accordingly, a plurality of events may be associated with a respective plurality of ranks and an output video content may be created by including, in the output video content, one or more segments of the input video content based on at least some of the plurality of ranks, e.g., selecting to include in the output video the top ranked events in an input video.

Some embodiments of the invention may produce an output video by identifying a plurality of events in an input video content; and selecting to include, in the output video content, one or more of the plurality of events based on a criterion or rule. For example, a rule may indicate a specific player is of interest and accordingly, events in which the indicated player appears (or is shown) may be selected for inclusion in the output video. A rule or criterion may indicate or prioritize a specific time portion (e.g., the end of the game is more interesting the beginning of the game) and accordingly, more events from the indicated time (e.g., $4^{th}$ quarter of a basketball game) may be selected for inclusion in the output video.

It will be noted that, as described, identifying events in an input video may be based on rules or criteria. For example, a rule provided to some embodiments, indicating a specific player is of interest may cause some embodiments to identify events that include the player. Accordingly, a system and method according to embodiments of the invention may identify events based on rules and criteria and may further select, from the identified events, some of the events for inclusion in an output video, based on a (possibly different) set of rules or criteria.

Some embodiments of the invention may produce an output video such the output video includes or portrays a narrative for the input video content. For example, a narrative may be, or may be related to, any one of: a player, a chronological aspect, a progress of a sports event, an outcome, result or score. For example, producing a narrative may include including, in the output video events related to a score, all occurrences or time when the score in the game is tight, when a team takes the lead and so on. For example, by examining the progress or evolution of a score of a game (e.g., based on analysis of the input video or based on external data as described), events that portray a narrative related to score may be selected and included in an output video. Similarly, in order to create a narrative related to a player, events that include the player may be selected and so on.

Some embodiments of the invention may produce an output video such the select to include, in an output video content, one or more of a plurality of identified events such that the output video content includes highlights related to at least one of: a player, a chronological aspect, a progress of a sports event and a score. For example, to produce a clip of highlights related to a player, events that include the player may be selected. A clip of highlights related to a score or progress of a game may be created by selecting events that include a losing team taking the lead, three points scores in a basketball game, a goal in a soccer game, a touch down and so on. Rules provided to a system may be related to the kind of input video being processed. For example, rules related to an input video related to a basketball game may enable a system to identify three points shots (e.g., by determining a position of a player who scores) while rules related to a soccer game enable a system to identify a player in offside.

As described, embodiments of the invention may receive external data and use the external data in producing an output video clip or content. Generally, external data as referred to herein may include any data that is not included in an input video content. For example, any data other than video frames and audio track received as input video 420 may be referred to, or considered herein as external data. For example, external data may be an audio track received from a radio station or it may be text collected from a website or a social network.

Some embodiments of the invention may synchronize the received external data with an input video content to produce synchronized external data and may use the synchronized external data in order to identify events in an input video and/or use the synchronized external data in order to select events for inclusion in an output video content or clip. For example, an audio track generated for a radio that broadcasts a game may be received. A system and method according to embodiments of the invention may synchronize the received audio track with an input video clip or content by determining a specific time (or offset from the beginning) in the received audio track is related, or corresponds to, a specific time (or offset from the beginning) in the input video clip. Various methods and logics may be employed in order to synchronize external data with an input video. For example, if the external data is textual data then identifying a phrase such as "the foul play occurred at time 2:34" may be used to synchronize the text with time 2:34 of the game in an input video. In another case, based on a phrase or word of an anchor in an external audio track, an event in the input video may be correlated with the external audio track. In yet other cases, metadata related to, and received with, external data (e.g., information indicating correlation of the external data with a sports event) may be used.

It will be noted that identifying events may be based on external data. For example, timestamped text downloaded from a website and including "this was a foul play" may be used in order to determine an event including a foul play occurred at the time indicated by the timestamp of the text. Embodiments of the invention may use and type of data in order to identify, determine or mark an event and/or in order to create an output video content based on events as described. For example, structured data (e.g., XML or JSON data) received and processed as described, may include an ID of a 'foul' and a time when the foul occurred in the game. Accordingly, an event may be identified based on structured or other external data, a start and/or end time of the event, in the input video content may be determined and event objects and/or metadata objects may be created or updated according to, or based on, the structured data or other data as described.

A time indication determined based on received data may be used to identify an event and/or determine at least one of: a start time and an end time of an event. For example, a roar of a crowd heard in an external audio track may be used in order to determine that an event started. A criterion may be used in order to determine a start or end time based on external data. For example, using a rule that dictates fixed time for events, if a whistle of a referee is heard on second 165 then an embodiments may determine the start time of the event is 160 and end time of the event is 170 (e.g., the rule dictates an event started 5 seconds before a whistle and ended 5 seconds after). In other cases or embodiments, the start time of an event may be determined as the time an event was identified in the external received data, e.g., the start time of an event is set to the time a whistle of the referee was heard. It will be noted that identifying events and/or determining a start and end time of events may be based on a number of rules, criteria and/or configuration parameters. For example, in addition to determining a start time of an event based on external data as described, the end time of the event may be set or determined based on other criteria, e.g., the end of the event is when a specific player no longer appears in the input video or other conditions are met. Accordingly, some embodiments of the invention may determine a time indication based on the received data (e.g., received external data) and may use the time indication to determine at least one of: a start time and an end time of an event.

In some embodiments, rules may be used in order to define, generate or create an output video content based on an input video content. For example, a rule may dictate that an output video content is to include specific type of events, events associated with specific ranks and the like. For example, a rule may be related to a player, a chronological aspect and/or to a progress of a sports event and, based on the rule, events may be selected, e.g., by server 210, for inclusion in an output video content. For example, based on a rule that indicates a specific player, server 210 may include, in an output video clip, events in which the indicated player participates or is shown. Rules may be related to any aspect of an input or input video, e.g., rules may be related to a transition, a score of a game, a change of source camera, a close-up, a movement of a player or object, a pan, tilt and zoom of a camera, a widening and narrowing of a field of view of a camera, face identification and a number identifying a player or object etc. Accordingly, rules may be used in order to cause server 210 to create an output video content as described such that the output video content is according to the rules.

For example, in some embodiments, a set of events may be identifies and the events may be defined, described and used based on objects such as metadata objects and/or events objects as described herein. A rule may be used in order to select events for inclusion in an output video clip or content.

For example, after a set of events have been identified, determined and/or categorized as described, two or more different rules (or sets of rules) may be used in order to create two or more different output video content objects or clips. For example, using the same set of events identified in an input video clip, a first rule may select a first subset of events for creating a first output video content and a second, different rule, may be used to select, from the same set of events, a second subset of events for creating a second output video content.

Some embodiments of the invention may determine a time indication based on received external data; and may determine the start time and/or the end time of a segment, in the input video content, wherein the segment includes the event. For example and as described, based on text in a social network or user chatter, an embodiment may determine that a point was scored on a specific moment (minute or second) of a game and may accordingly define or set the start time of an even. An embodiment may use a start time and an end time to define or select a segment of an input video. For example, an embodiment may determine, based on an audio track, that an event started on time 22:45 (when representing minutes and seconds of a game as minutes:seconds) and the embodiment further determined the event ended at time 22:55 then a segment of 10 seconds (starting at 22:45 and ending at 22:55) may be associated with the event. If it is determined that the event is to be included in an output video, e.g., based on a rank or filter, then the 10 seconds segment discussed in the above example may be included in the output video.

An embodiment may determine or receive a category of an input video and events included in an output video may be based on a category. For example, a category may be a type of game (e.g., basketball, soccer, hockey etc.) or a category may be "news", "politics", "nature" and the like. Based on a category, events may be identified in an input video and/or selected for inclusion in an output video. For example, in producing output video clips or content, different rules may be used for different category, e.g., a first set of rules or criteria may be used for a first category and a second set of rules or criteria is used for a second category. For example, for a category of sports, a rule may dictate a roar of a crowd indicates an event but, for a category of politics, a roar of a crowd may be ignored and a rule may dictate that the word "election" indicates an event. In a similar fashion, ranking events may be based on rules related to categories. Accordingly, rules and criteria for identifying and selecting events may be related to, or based on, a category of the input video content.

A rule or set of rules or criteria may be used, e.g., by server 210, in order to define and/or create an output video content. For example, as described, after identifying events, a rule may be used, by server 210, in order to select which events will be included in an output video clip. For example, a rule may be related to ranks described herein, e.g., a rule may dictate that only events with a rank higher than a threshold will be included in an output video clip.

A rule, filter or criterion may be used, e.g., by server 210, in order to decide if, how and/or where to publish an output video content. For example, based on a rule, server 210 may publish an output video clip in (or to) digital destinations. For example, based on a rule, server 210 may publish an output video clip in a social network, online video platform, a webpage and the like. For example, a rule may indicate that events from a recent basketball game are to be published in a website, e.g., during 2 days following the game. Accordingly, a system and method according to embodiments of the invention may automatically generate video content (e.g., highlights of a game) and the system and method may further automatically upload or publish generated content. For example, a video clip that includes highlights of a game may be automatically created, by server 210 as described and may be automatically uploaded, by server 210, to a website or to a social platform.

Some embodiments of the invention may identify events in an input video and/or select events for inclusion in an output video, based on a target audience of the output video content. For example, if the target audience is fans of a specific team then a rule may prioritize events that include members of team or events that include the star of the team. For example, an output video clip created for a specific country or state may include events that capture players born in the country or state. Any other aspects or information characterizing a target audience (e.g., interests or the target audience, preferences of the target audience and the like) may be used, by embodiments of the invention, in order to define rules for identifying or ranking events in an input video. Any information characterizing a target audience may be used, by embodiments of the invention, for selecting events or segments in an input video for inclusion in an output video. As described, rules may be used for selecting and including events in an output video. For example, a first set of rules may be used for identifying or ranking events in an input video and a second, different set of rules may be used for selecting identified events and including the selected events in an output video clip or content as described.

Some embodiments of the invention may select to include, in the output video content, one or more events, or parts of events, based on a desired length of the output video content. For example, a desired length may be based on a rule, or it may be based on a specification received from a user. For example, a rule may include a threshold and may further dictate or indicate that the length of an output video clip for a specific category cannot be longer than the threshold. It will be understood that any logic related to a length of an output video produced as described may be included in a rule as described. For example, a rule may specify the maximum length or the minimal length of an output video with respect to a category, a game, a player, a target audience and the like.

For example, if the length of the output video is to be 32 seconds (e.g., a client requested a 32 seconds highlights or summary of a game) then an embodiment may examine the length of identified events (or their associated segments) and select a number of events for creating the output video such that the output video is 32 seconds long. For example, an embodiment may select, in ascending order, top or highest ranked events for inclusion in an output video until a desired length is reached. For example, the highest 5 ranked events in an input video clip may be included in a first output video content or clip and only the highest 3 ranked events of the same input video clip may be included in a second, shorter, output video content or clip.

Some embodiments of the invention may generate metadata related to the input video content and include, in the output video content, one or more segments of the input video content based on the metadata. For example, metadata generated for an input video clip of a tennis game may be the text or phrase "tie breaker" generated by examining the score. Metadata generated for a video clip that shows a safari may include data obtained from the internet, e.g., the population of elephants, hunting habits or methods of lions etc. Any metadata, e.g., textual or graphic may be generated to obtained by embodiments of the invention and may be included in an output video clip or content.

Some embodiments of the invention may modify a webpage by inserting, including or embedding video content in the webpage. For example, some embodiments of the invention may semantically or otherwise analyze text and content in a webpage (e.g., as described herein) and may, based on a result of the analysis, select one or more segments of a video clip and insert, include or embed the selected segments in the webpage. Segments selected for a webpage as described may be used to create an output clip and the output clip may be inserted, included or embedded in the webpage.

In some embodiments, other than including, in the output video content, portions or segments of the input video content, additional content may be obtained or generated and the additional content may be included in the output video. For example, an intro that may be a segment or clip serving as an introduction to a subject, topic, segment or serving as an introduction for the entire output video clip or content may be generated by an embodiment of the invention and may be in inserted, into an output video clip, e.g., at the beginning of the output video content or right before a segment or portion in an output video clip. In other cases or embodiments, a middle-graphics segment or content may be inserted in between selected segments or events in the output video content or clip. In yet other embodiments or cases, an outro portion that concludes a segment or concludes the output video may be inserted by an embodiment of the invention.

Selecting content for insertion into an output video content may be done, automatically, by an embodiment of the invention. For example, based on a category of the input video identified or determined as described herein, content generation unit 335 may select a video content or clip and insert the selected content into the output video as an intro, middle-graphics or as an outro. For example, if the input video is related to basketball and it is further known that the target audience includes fans of one of the teams in the game then content generation unit 335 may select for an intro a video clip of the star of the team, select for middle-graphics a clip of a historical game of the team and so on. Content for inclusion in an output video clip or content, e.g., content used for generating and including elements such as an intro, middle-graphics or outro may be stored in a database (e.g., database 220) and content generation unit 335 may select content from the database based on a rule and/or based on metadata of the content. For example, video clips of a specific team or player may be associated with metadata describing the clips such that given a name of a team or a name of a player, content generation unit 335 may readily select relevant video content from the database and use the selected video as described herein.

Any rule or configuration parameters may be used for selecting external video or graphic content (other than the input video content) for insertion into an output video content or clip. For example, the length of an intro or outro may be selected, by content generation unit 335, based on a desired length of the output video content as described herein, e.g., an intro and/or outro may be selected, by content generation unit 335, such that the output video clip is kept at a desired length. Content generation unit 335 may select external video or graphic content for inclusion in the output video based on any user input as described herein, e.g., if analysis of web chatter or other user input indicates that there is a high interest in a specific player or team then content generation unit 335 may select to generate an intro or an outro using video or graphic content of the specific player or team.

Analysis of the input video content may include identifying various effects and/or modifications applied to the input video content. For example, effects such as a replay and a slow motion effect may be identified, in the input video content, by video analysis unit 340, and identified effects may be marked (e.g., by including in a metadata object an indication of the effect, its type, offset, length and the like). Video analysis unit 340 may associate an effect identified in an input video content with an event identified in the input video content. For example, a replay of a three points score in an input video clip (e.g., shown at time 18:23 of the input video clip) may be associated, by video analysis unit 340, with the actual event of the scoring of the three points (e.g., shown at time 18:01 of the input video clip). For example, pointers (e.g., from metadata objects to segments as described) may be used in order to associate an effect and/or modification applied to the input video to an event identified in the input video. Accordingly, an embodiment of the invention may relocate an effect and/or modification in an output video content, e.g., by inserting a segment with an effect into a selected offset of the output video content as described.

In some embodiments, a segment including an effect and/or modification applied to the input video content may be identified and marked (e.g., using a start and end time as described) and the segment may be relocated, in the output video, such that it is placed near a segment that includes the actual event. For example, content generation unit 335 may place, in the output video content, a replay of an event near (e.g., immediately after) the actual event. For example, if a replay of a dunk appears, in the input video content, 25 seconds after the dunk itself then content generation unit 335 may place the replay, in the output video content, such that it starts when the dunk event ends. In some embodiments, content generation unit 335 may join or stitch, in an output video content, an effect and/or modification and an event found in the input video, such that the effect and/or modification and the relevant event are shown in sequence or together, e.g., such that a replay of an event is shown immediately after the event.

External data related to an input video content may be a second or additional video content. For example, an input video content (also referred to herein as a primary input video content) may be received from a first source or camera (e.g., a network, or a provider of video broadcasts) and a relevant or related second or additional video content may be received from a second source or camera (e.g., an online network streaming). Synchronization module 315 may synchronize a second or additional input video content with a first (or primary) input video content such that, for example, using a start time of an event in a primary input video content, the event may be readily identified in, and/or extracted from, the second (or secondary) or additional video content. In some embodiments, synchronization module 315 may generate a synchronized secondary or second video content such that metadata, pointers and all other information generated for a primary video content can be readily used for performing operations as described herein with respect to the synchronized secondary video content.

Content generation unit 335 may use a synchronized second video content in order to include, in the output video content, one or more segments of the synchronized second video content. For example, having identified an event as described herein, content generation unit 335 may generate an output video content that include multiple views of an event by including, in an output video content, segments of the event as captured by a first camera (e.g., provided in a primary video clip) and further including, in the output video content, segments of the same event as captured by a second camera (e.g., obtained from an internet or online service).

Some embodiments of the invention enable remote systems, servers or units to use some, or even all of the information generated and/or identified by a system as described herein. In some embodiments, a system and method may send, or otherwise provide, any relevant information or data generated and/or identified as described herein to a remote system or unit. For example, server 210 may send, to a remote system, metadata objects 440 and event objects 450 and any other information related to an input video content and/or to an output video content. Using information and data related to an input video content and/or to an output video content and applying logic as described herein, a remote system may perform methods of generating an output video as described herein. For example, some, or even all of, audio analysis module 310, synchronization module 315, user interface module 320, ranking module 325, social chatter module 330, content generation unit 335 and video analysis unit 340 may be included in the remote system and, accordingly, the remote system may generate an output video as described herein.

In some embodiments, data and information such as metadata objects 440 and event objects 450 may be generated, e.g., by server 210, based on a first (local) input video content and the data (e.g., metadata objects 440 and event objects 450) may be used, by a remote system, to generate an output video content based on another, second (remote) input video content. For example, server 210 may send, to the remote system, data or parameters that enable the remote system to synchronize its own input video content with the input used by server 210 such that metadata and pointers as described herein are usable in order to create an output video based on the remote input video content.

One advantage of exporting information that enables creating output video clips as described (e.g., exporting metadata objects 440 and event objects 450) may be realized when considering broadcast quality video content. For example, server 210 may generate and/or identify and store information for creating an output video (e.g., metadata objects 440 and event objects 450) based on an input video with relatively low resolution (e.g., 720 P or 1080 P), provide the information (e.g., metadata objects 440 and event objects 450) to a remote system, and the remote system may use the information to create an output video content based on an input video with high resolution, e.g., 4K or other high resolution or high bandwidth content as known in the art. Accordingly, by exporting data (e.g., metadata objects 440 and event objects 450) to remote systems, an embodiment may enable reusing the exported data to create output video content, by remote systems, based on any input content format or resolution. For example, exporting data as described overcomes the need to transfer large amounts of data (as is the case with broadcast quality video content), e.g., to server 210, rather, server 210 may provide required data as described and the actual payload of a broadcast quality video content does not need to be communicated since the remote system can readily use data such as metadata objects 440 and event objects 450 in order to create an output video based on broadcast quality video content.

For example, server 210 may send information for synchronizing an input video content used by server 210 with an input video content used by a remote system (e.g., in the form of frames, offset and/or other methods as known in the art). Server 210 may send a start time and an end time of an event to the remote system (e.g., included in one of metadata objects 440 and event objects 450). Accordingly, the remote system can generate an output video that includes the event by executing logic as described herein. A remote system may use any rules or criteria and/or user or other input as described herein, accordingly, any output video content created as described herein may be created, by a remote system based on any input video content, e.g., 210 may use low resolution input video content to generate data and provide the data to a remote system and the remote system may use data from server 210 to create output video content using broadcast quality, high definition or high bandwidth video as input.

In some embodiments, in addition to data and information such as metadata objects 440 and event objects 450 sent to a remote system, a system and method may send video or other content to the remote system, and the remote system may include the content in output video content generated by the remote system. For example, a remote system may use video content sent by server 210 in a way similar to the way a secondary or additional video content may be used by embodiments as described herein. For example, a remote system may use video content received from server 210 and segments of its own input video to create an output clip.

In some embodiments, segments that include events may be encoded and may further be cached or stored. Cached or stored encoded segments may be re-used for generating video clips, without having to re-encode them. For example, a start time and an end time of one or more events captured in an input video content may be determined as described herein.

An embodiment (e.g., server 210) may generate one or more encoded event segments by encoding portions of segments that include the events. For example, if a segment that includes or captures an event starts at time 20 and ends at time 30 then an encoded event segment may be generated, for the event, by encoding the portion (or sub-segment), of the input video content, that starts at time 21 and ends at time 29. Accordingly, a cached encoded event segment may be an encoded portion of a segment that is time-wise contained or confined by, or included in, a segment associated with the event. As described, one or more encoded event segments may be cached or stored such that they may be reused as described.

Content generation unit 335 may encode a transition video clip to be used as a transition (e.g., transition between clips as known in the art) and thereby create an encoded transition segment. In some embodiments, content generation unit 335 may generate an encoded transition segment by encoding the transition video clip according to the same format or protocol used for encoding the cached encoded event segments. In order to create an output video, content generation unit 335 may concatenate one or more encoded transition segments and one or more cached encoded event segments. Accordingly, the need to re-encode sub-segments of events in order to create video clips that include transitions is eliminated and, thus, the process of generating video clips with transition effects may be greatly improved, e.g., made much faster and requiring substantially less computational resources than known systems and methods. A sub-segment of an event may be a video clip or segment that includes a portion of the event. For example, a sub-segment of an event that starts at time 5 and ends at time 15 may be a segment that covers times 6 to 14. In some embodiments, in order to reuse the same one or more sub-segments of events for creating two or more video output content objects, server 210 may re-encoded transition segments and concatenate the re-encoded transition segments and the sub-segments. Accordingly, the sub-segments may be reused for creating multiple video clips without having to re-encode them each time they are used.

In some embodiments, using the start time and the end time to define a segment for, or associate a segment with, an event, produce an encoded event segment by encoding a sub-segment of the segment, e.g. such that the sub-segment is included in the segment, cache the sub-segment. A plurality of encoded event segments may be created (and cached) using sub-segments as described. To produce one or more output video contents, an embodiment, e.g., content generation unit 335, may encode one or more transition video segments and concatenate one or more encoded transition segments and one or more cached encoded event segments.

As described, embodiments of the invention address an Internet-centric challenge of automatically generating video content. As described, a system and method may automatically generate specific video content, e.g., highlights of a game, and may further provide the generated content, e.g., publish content in a website as described. As described, specific computer-related data formats are created and used, for example, metadata objects and event objects are generated by a system and method of the invention and are used as described. Embodiments of the invention improve an operation of a computerized system. For example, operation of a server may be improved by causing the server to perform operations performed by server 210 as described. Accordingly, a server improved based on the present application may automatically generate content as described. It is noted that embodiment of the invention do not merely manipulate data. As described, embodiments of the invention generate new data objects (e.g., metadata objects and output video content) and use generated data for providing video content as described.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of generating output video content, the method comprising:
    receiving an input video content;
    receiving data related to but not included in the input video content, wherein the received data includes a social media text post and at least one of: audio content, video content and statistical content;
    analyzing the input video content to produce an analysis result, wherein producing the analysis result is based on analysis of the received data;
    identifying at least one event in the input video content based on semantic analysis of the social media text post;
    generating, based on the received data and based on the analysis result, a plurality of metadata objects, wherein each metadata object includes:
        a rank set by a server according to at least one of: the analysis result and input from a plurality of users, and
        at least one data element selected from the group consisting of:
        a start time of a segment, an end time of a segment, a duration of the at least one event, a description of the at least one event, a type of the at least one event, an identification of a person, a pointer to a metadata object, a category, a rank set according to social chatter and an identification of a video effect;
    storing at least some of the metadata objects in a database;
    associating the at least some of the metadata objects with respective at least some segments of the input video content;
    selecting segments to include in an output video content based on the at least some of the metadata objects and the identified at least one event;
    generating information for synchronizing the input video content used by a server with the input video content used by a remote system;
    sending the information for synchronizing, from the server to the remote system;
    using the information for synchronizing, by the remote system, to produce a remote video output content;
    sending content to the remote system, wherein the content has a higher resolution than the input video content and including the content, by the remote system, in the remote video output content.

2. The method of claim 1, wherein analyzing the input video content includes identifying at least one of: a transition, a score of a game, a change of source camera, a close-up, a movement of a player or object, a pan, tilt and zoom of a camera, a widening and narrowing of a field of view of a camera, face identification and a number identifying a player or object.

3. The method of claim 1, wherein the input video includes at least one additional content selected from: audio content and textual content, and wherein analyzing the input video content to produce an analysis result includes analyzing the at least one additional content.

4. The method of claim 1, wherein the received data includes at least one of: structured data and free text.

5. The method of claim 4, wherein the free text includes at least one of: closed captions and a transcript.

6. The method of claim 1, comprising:
    identifying a plurality of events captured in the video content;
    associating, based on the analysis result and based on at least one criterion, the plurality of events with a respective plurality of ranks; and
    including, in the output video content, one or more segments of the input video content based on at least some of the plurality of ranks.

7. The method of claim 1, comprising:
    identifying a plurality of events in the input video content; and
    selecting to include, in the output video content, one or more of the plurality of events such that the output video content includes a narrative, wherein the narrative is related to at least one of: a player, a chronological aspect, a progress of a sports event and a score.

8. The method of claim 1, comprising:
    identifying a plurality of events in the input video content; and selecting to include, in the output video content, one or more events or parts of events based on at least one of: contextual text analysis of a web-page and one or more of: a desired length of the output video content, a target audience of the output video content, and a determined category of the input video content.

9. The method of claim 1, comprising:
identifying, in the input video content, at least one of a replay and a slow motion effect and associating the at least one of replay and a slow motion effect with an event;
based on at least one of: the input video content, the data related to the input video content, the output video and destination, generating or selecting at least one of: an outro, a middle-graphics, and an intro; and
including at least one of the replay and the slow-motion effect, the outro, middle-graphics, and an intro in the output video content.

10. The method of claim 1, comprising:
encoding a first segment of the input video content, the first segment including the start time and up to a key-frame;
direct-copying a second segment of the input video content, the second segment including the key-frame and the end time; and
generating the output video content by concatenating the first and second segments.

11. The method of claim 1, further comprising selecting to include, in the output video content, one or more of a plurality of events based on a narrative.

12. The method of claim 1, wherein the received data includes textual content provided by users in a network.

13. The method of claim 1, comprising, modifying a metadata object according to input from a user.

14. The method of claim 1, comprising:
copying a metadata object, the metadata object associated with a first input video content, to produce a copied metadata object; and
associating the copied metadata object with a second, different video content.

15. The method of claim 1, comprising, modifying a rank based on a sequence of events.

16. The method of claim 1, comprising:
providing a set of metadata objects to a remote system; and
generating, by the remote system, an output video content based on the set of metadata objects and based on an input video received by the remote system.

17. The method of claim 1, comprising, generating, and publishing, in real-time, an output video content based on input from a user.

18. A system comprising:
a memory; and
a controller configured to:
receive an input video content;
receive data related to but not included in the input video content, wherein the received data includes a social media text post and at least one of: audio content, video content and statistical content;
analyze the input video content to produce an analysis result wherein producing the analysis result is based on analysis of the received data;
identifying at least one event in the input video content based on semantic analysis of the social media text post;
generate, based on the received data and based on the analysis result, a plurality of metadata objects, wherein each metadata object includes:
a rank set by a server according to at least one of: the analysis result and input from a plurality of users, and
at least one data element selected from the group consisting of:
a start time of a segment, an end time of a segment, a duration of the at least one event, a description of the at least one event, a type of the at least one event, an identification of a person, a pointer to a metadata object, a category, a rank set according to social chatter and an identification of a video effect;
store at least some of the metadata objects in a database;
associate the at least some of the metadata objects with respective at least some segments of the input video content;
select segments to include in an output video content based on the at least some of the metadata objects and the identified at least one event;
generate information for synchronizing the input video content used by a server with the input video content used by a remote system;
send the information for synchronizing, from the server to the remote system;
use the information for synchronizing, by the remote system, to produce a remote video output content;
send content to the remote system, wherein the content has a higher resolution than the input video content; and
include the content, by the remote system, in the remote video output content.

19. The system of claim 18, wherein analyzing the input video content includes identifying at least one of: a transition, a score of a game, a change of source camera, a close-up, a movement of a player or object, a pan, tilt and zoom of a camera, a widening and narrowing of a field of view of a camera, face identification and a number identifying a player or object.

20. The system of claim 18, wherein the input video includes at least one additional content selected from: audio content and textual content, and wherein analyzing the input video content to produce an analysis result includes analyzing the at least one additional content.

21. The system of claim 18, wherein the controller is configured to:
identify a plurality of events captured in the video content;
associate, based on the analysis result and based on at least one criterion, the plurality of events with a respective plurality of ranks; and
include, in the output video content, one or more segments of the input video content based on at least some of the plurality of ranks.

22. The system of claim 18, wherein the controller is configured to:
identify a plurality of events in the input video content; and
select to include, in the output video content, one or more of the plurality of events such that the output video content includes a narrative, wherein the narrative is related to at least one of: a player, a chronological aspect, a progress of a sports event and a score.

23. The system of claim 18, wherein the controller is configured to include, in the output video content, one or more of a plurality of events based on a narrative.

* * * * *